(12) United States Patent
Thomas

(10) Patent No.: US 10,863,765 B2
(45) Date of Patent: Dec. 15, 2020

(54) HIGH-FAT AND HIGH-PROTEIN ANIMAL FEED SUPPLEMENT AND PROCESS OF MANUFACTURE

(71) Applicant: Nationwide 5, LLC, Ord, NE (US)

(72) Inventor: Michael Ray Thomas, St. Clair, MO (US)

(73) Assignee: NATIONWIDE 5, LLC, Ord, NE (US)

( * ) Notice: Subject to any disclaimer, the term of this patent is extended or adjusted under 35 U.S.C. 154(b) by 43 days.

(21) Appl. No.: 15/607,288

(22) Filed: May 26, 2017

(65) Prior Publication Data

US 2017/0258125 A1 Sep. 14, 2017

Related U.S. Application Data

(63) Continuation-in-part of application No. 13/659,828, filed on Oct. 24, 2012, and a continuation-in-part of application No. 14/866,926, filed on Sep. 26, 2015.

(51) Int. Cl.

| A23N 17/00 | (2006.01) |
|---|---|
| A23D 9/05 | (2006.01) |
| A23K 20/147 | (2016.01) |
| A23K 20/158 | (2016.01) |
| A23K 50/15 | (2016.01) |

(Continued)

(52) U.S. Cl.
CPC .......... *A23N 17/005* (2013.01); *A23K 20/147* (2016.05); *A23K 20/158* (2016.05); *A23K 40/20* (2016.05); *A23K 40/25* (2016.05); *A23K 50/10* (2016.05); *A23P 30/20* (2016.08); *B29C 48/06* (2019.02); *B29C 48/30* (2019.02); *B29C 48/32* (2019.02); *B29C 48/345* (2019.02); *B29C 48/402* (2019.02); *B29C 48/505* (2019.02); *B29C 48/911* (2019.02); *B29C 48/92* (2019.02); *F26B 17/20* (2013.01); *A23N 17/00* (2013.01); *B29C 2948/92* (2019.02); *B29C 2948/926* (2019.02); *B29C 2948/92019* (2019.02); *B29C 2948/92209* (2019.02);

(Continued)

(58) Field of Classification Search
CPC ........ A23K 40/20; A23K 50/10; A23K 40/25; A23K 20/147; A23K 20/158; A23P 30/20; A23N 17/005; A23N 17/00
See application file for complete search history.

(56) References Cited

U.S. PATENT DOCUMENTS

| 1,435,404 A | 11/1922 | Lloyd |
| 3,458,321 A | 7/1969 | Reinhart et al. |

(Continued)

*Primary Examiner* — Seyed Masoud Malekzadeh
(74) *Attorney, Agent, or Firm* — Doster Greene, LLC

(57) ABSTRACT

A system according to various embodiments can include a source for supplying a material to be treated, an extruder, at least two screws, and a drive coupled to the screws for axially rotating the screws. The extruder includes an inlet for receiving the material, which is fed therein in a controlled manner. The screws are provided within the housing of the extruder. The screws have a plurality of compression and release stages that create mechanical heat which is directly applied to the material to change the mechanical properties of the material thereby facilitating a conversion of a physical state of the material from a non-compactable state to a compactable state as the screws rotate and move the material longitudinally along the screws to produce a final product, for example, a feed tub for use as an animal feed.

8 Claims, 30 Drawing Sheets

(51) Int. Cl.
  *A23P 30/20* (2016.01)
  *A23K 40/20* (2016.01)
  *B29C 48/505* (2019.01)
  *F26B 17/20* (2006.01)
  *B29C 48/88* (2019.01)
  *A23K 40/25* (2016.01)
  *A23K 50/10* (2016.01)
  *B29C 48/06* (2019.01)
  *B29C 48/92* (2019.01)
  *B29C 48/32* (2019.01)
  *B29C 48/40* (2019.01)
  *B29C 48/345* (2019.01)
  *B29C 48/30* (2019.01)

(52) U.S. Cl.
  CPC ........... *B29C 2948/92428* (2019.02); *B29C 2948/92704* (2019.02); *B29C 2948/92923* (2019.02)

(56) References Cited

U.S. PATENT DOCUMENTS

| | | | | |
|---|---|---|---|---|
| 3,904,769 | A | 9/1975 | Sair | |
| 4,016,296 | A | 4/1977 | DeSantis | |
| 4,062,988 | A | 12/1977 | DeSantis | |
| 4,088,528 | A | 5/1978 | Berger | |
| 4,118,163 | A | 10/1978 | Lee | |
| 4,118,164 | A * | 10/1978 | Wenger | A23J 3/26 425/202 |
| 4,125,635 | A | 11/1978 | de Ruyter | |
| 4,160,041 | A * | 7/1979 | Schroeder | A23K 20/158 426/334 |
| 4,234,608 | A | 11/1980 | Linehan | |
| 4,409,165 | A | 10/1983 | Kim | |
| 4,431,675 | A | 2/1984 | Schroeder et al. | |
| 4,450,791 | A | 5/1984 | Briggs | |
| 4,525,313 | A | 6/1985 | Muller | |
| 4,600,311 | A | 7/1986 | Mourrier | |
| 4,631,192 | A | 12/1986 | Mommer et al. | |
| 4,716,000 | A | 12/1987 | Kerschbaum | |
| 4,735,809 | A | 4/1988 | Donovan et al. | |
| 4,839,193 | A | 6/1989 | Mange | |
| 4,875,847 | A | 10/1989 | Wenger | |
| 4,935,183 | A | 6/1990 | Wenger | |
| 4,960,601 | A | 10/1990 | Cummins | |
| 4,981,711 | A * | 1/1991 | Kearns | A23J 3/26 426/1 |
| 5,260,089 | A * | 11/1993 | Thornberg | A23K 10/38 426/489 |
| 5,332,099 | A | 7/1994 | Thornberg | |
| 5,456,870 | A | 10/1995 | Bulgrin | |
| 5,773,070 | A | 6/1998 | Kazemzadeh | |
| 5,798,077 | A | 8/1998 | Womer | |
| 5,939,124 | A | 8/1999 | Wenger | |
| 6,017,145 | A | 1/2000 | Jenkins | |
| 6,168,803 | B1 | 1/2001 | Harris et al. | |
| 6,228,308 | B1 | 5/2001 | Uehara | |
| 6,247,836 | B1 | 6/2001 | Nakajima | |
| 6,328,919 | B1 | 12/2001 | Pham | |
| 6,777,019 | B1 * | 8/2004 | Thornberg | A23K 40/20 426/512 |
| 7,008,202 | B2 | 3/2006 | Teraoka | |
| 7,521,076 | B1 | 4/2009 | Wenger | |
| 7,611,347 | B1 | 11/2009 | Kearns | |
| 7,654,813 | B1 | 2/2010 | Kearns | |
| 8,287,268 | B1 * | 10/2012 | Thomas | A23K 10/38 425/382.4 |
| 2003/0075833 | A1 | 4/2003 | Thomson | |
| 2003/0094393 | A1 * | 5/2003 | Sahm, III | B65D 1/42 206/505 |
| 2003/0118690 | A1 * | 6/2003 | Bartle | A23K 40/20 426/2 |
| 2004/0080064 | A1 | 4/2004 | MacPhee | |
| 2004/0115324 | A1 | 6/2004 | Richard | |
| 2006/0034958 | A1 | 2/2006 | Schlummer | |
| 2006/0113695 | A1 | 6/2006 | De Maria | |
| 2008/0125612 | A1 * | 5/2008 | Bruckmayer | B04B 1/20 568/840 |
| 2014/0287124 | A1 * | 9/2014 | Goto | A23N 17/005 426/574 |
| 2015/0367298 | A1 * | 12/2015 | Wenger | B29C 48/59 366/88 |

\* cited by examiner

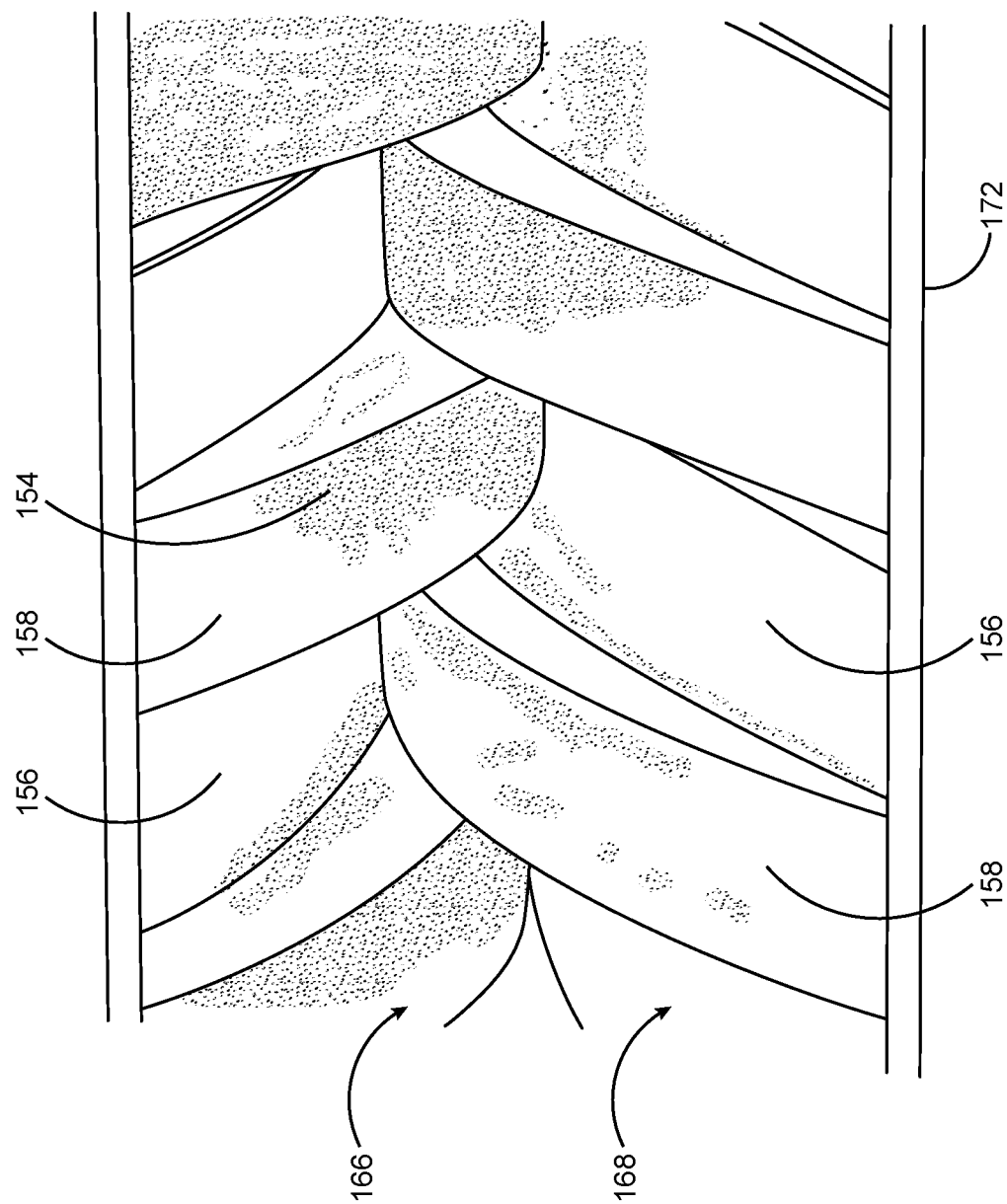

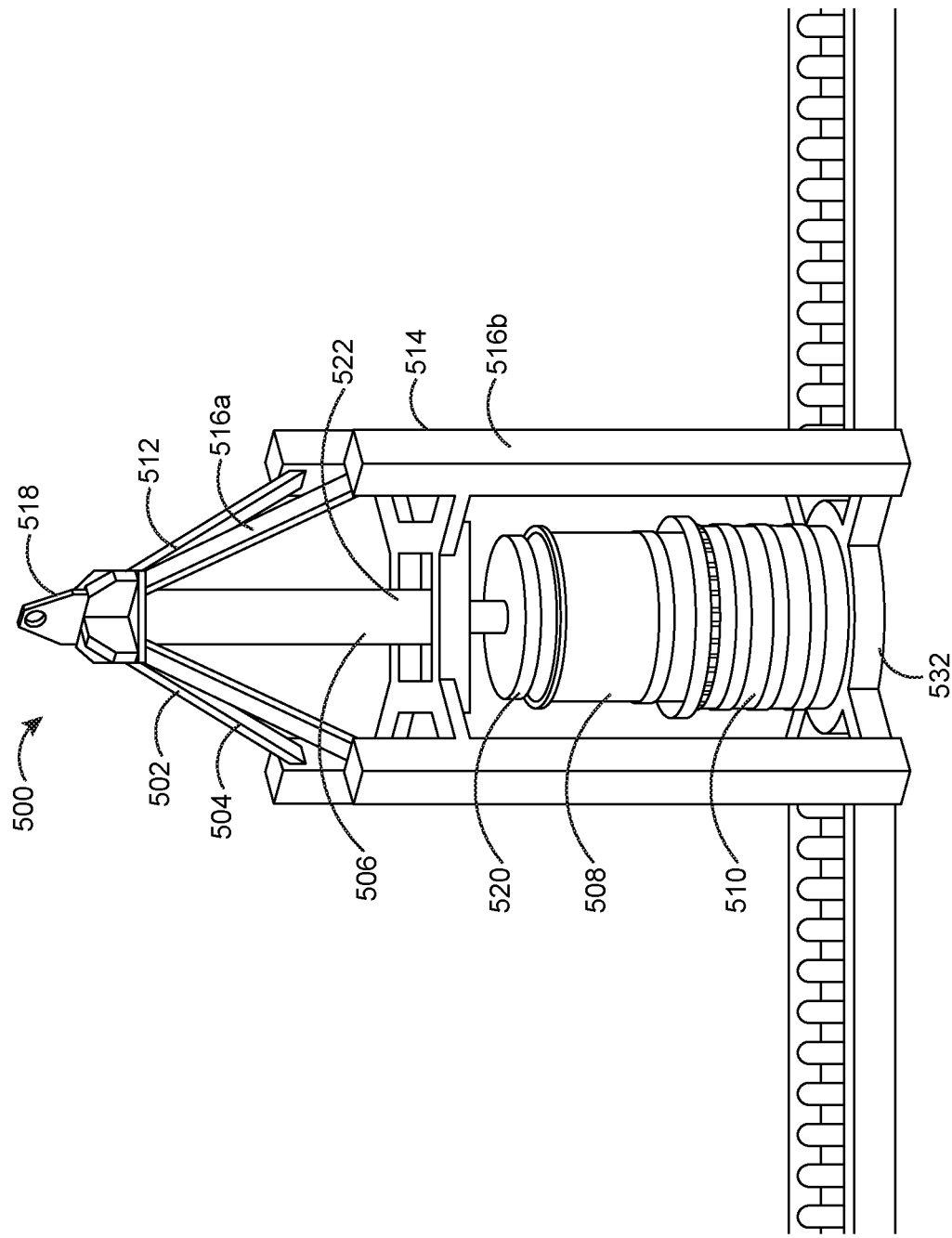

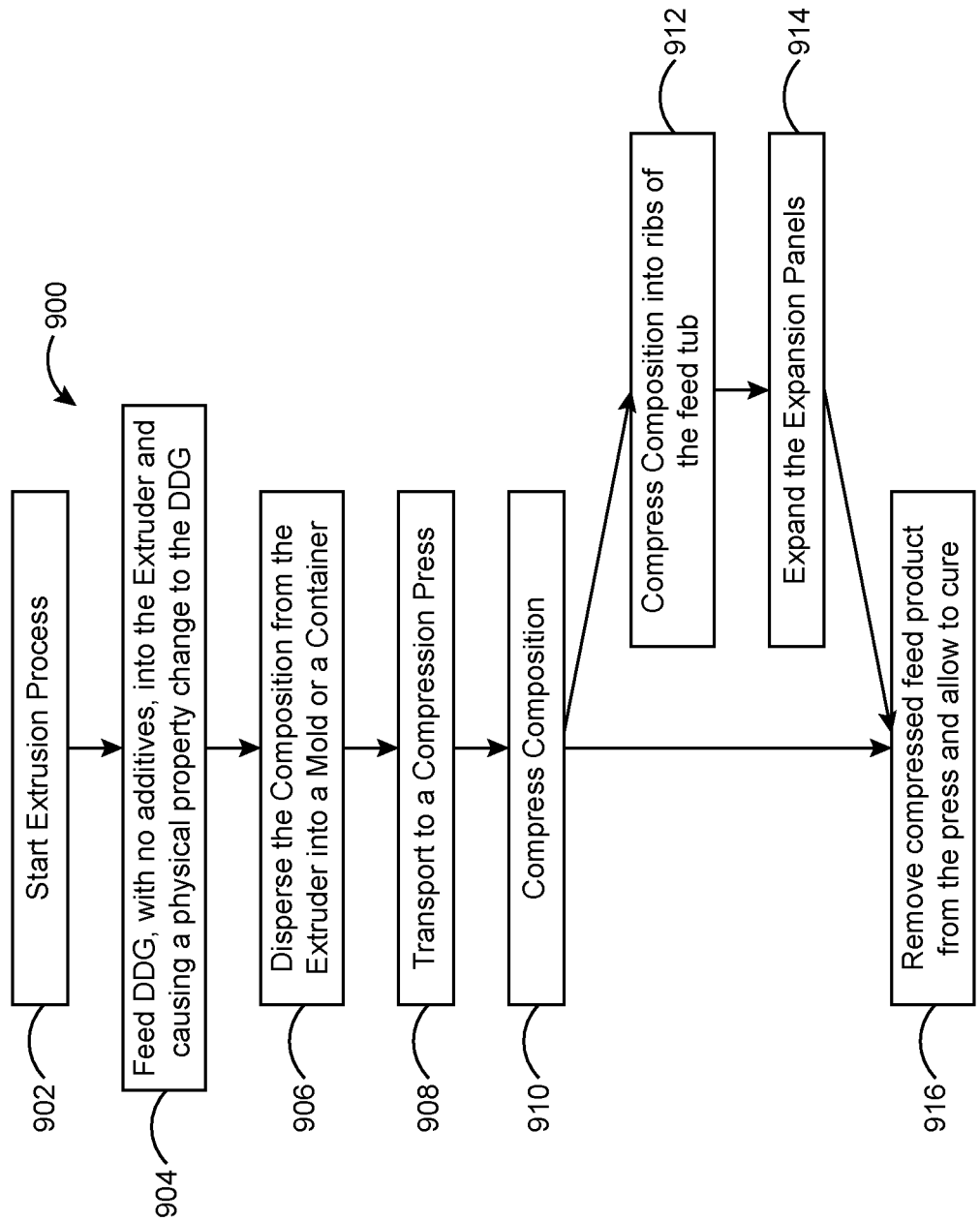

HIGH-FAT AND HIGH-PROTEIN ANIMAL FEED SUPPLEMENT AND PROCESS OF MANUFACTURE

RELATED APPLICATIONS

This application is a continuation-in-part of U.S. application Ser. No. 13/659,828 filed Oct. 24, 2012 and a continuation-in-part of U.S. application Ser. No. 14/866,926 filed Sep. 26, 2015.

INCORPORATION BY REFERENCE

All publications, patents, and patent applications mentioned in this specification are herein incorporated by reference in their entirety as if each individual publication or patent application was specifically and individually indicated to be incorporated by reference in its entirety.

Field

The present teachings relate to devices and methods for preparing animal feed products having a high-fat and high-protein content, with no additives, in various forms such as a dry grain, cubes, and supplement tubs, and, in particular, to animal feed in a hard, block form.

Introduction

In the livestock industry, concerns over grain quality have placed an increased focus on the best form of feed for livestock. Typically, livestock feed is available in various forms, such as loose grains, pellets, cube, blocks, and tubs. There are pros and cons associated with each form of feed.

Generally, loose grain is spread and distributed throughout a pasture for livestock to consume as they graze. One drawback of loose grain is that most damage, which occurs to outdoor loose grain, is caused by mold and insects. Management of field insect pests and moisture often receive a great detail of attention from feed producers. Grain spoilage occurs as microorganisms feed on the nutrients in the grain. Insects give off moisture that can cause grain moisture to create a mold problem. Another moisture problem, which cannot be controlled, is the weather. This is even more critical if it rains. Therefore, outdoor loose grain must be considered a short-term feed that must be quickly consumed by the livestock or spoilage will occur.

One of the benefits of loose grain is that it does not undergo a compaction or compression process to make the ingredients bind together such as a cube, pellet, block, or tub. Since the loose grain is not compacted, its nutritional value is not reduced due to binding. Thus, in the industry, loose grain typically provides the best nutritional value. However, it is difficult, sometimes, for the livestock to easily pick up or access the loose grain in a vegetated field (i.e. grass, forage). Access to the loose grain can become blocked by growing vegetation. Furthermore, it is difficult for the livestock to rapidly consume the loose grain spread throughout the pasture and gain the benefit of the nutritional value before the loose grain spoils. This yields on average an economic loss of about 40%-60% of the loose grain.

To address loose grain spoilage, the industry began the process of compacting the loose feed, such as dried distiller grain (DDG), into pellet form. Pellet feed typically is forced through a pelletizing die to form a predetermined size of a pellet. The drawback to pellets is forcing the ingredients through a pellet die under pressure to bind the components together. It is common for pellet feed to include an additive to bind it together. Consequently, feed produced through compaction often sacrifices some of its nutritional value in order to produce a tightly bound pellet. Additives included within the pellet feed decrease the nutritional value of the feed.

The feeding method is one of the most favorable characteristics of feed pellets. Pellets can be handled in bulk and easily distributed on the ground anywhere the livestock is located.

Farmers often use solid animal feed to supplement the daily diet of animals to provide energy, protein, fat, minerals, and vitamins to livestock. These animal feed supplements can be formed as solid blocks or solidified in tubs. These animal feed supplements continue to gain popularity with livestock producers, because they are easy to store, require little labor and equipment. The solid feed supplements are usually placed about the area in which the livestock grazes such that the livestock can feed on a free-choice basis.

Generally, there are two main approaches of manufacturing solid animal feed supplements. The first approach includes the production of feed supplements from extreme physical compression of materials. However, some of these processes exhibit low inclusion rates for nutritive liquids. The second approach involves feed supplements formed by the reaction of metal oxides, such as calcium and magnesium oxides, and water bearing nutrient media, such as molasses, and a variety of other agents.

The drawback for both approaches is that in order to mix and bind the ingredients together to achieve their large sizes some sacrifices in nutrition are made, similar to pellet feed. These conventional methods of producing feed that generally use compression or compaction typically require the inclusion of additives. Such steps can reduce the nutritional value by 50% for feed produced by these conventional methods in comparison to the nutritional value of loose grain. In order for the livestock to receive the nutritional value equivalent to the loose grain feed, twice as much feed may need to be prepared from these types of conventional compaction and compression methods and shipped to the livestock. Although the conventional pellets, cubes, blocks, and tubs are practical in terms of convenience, handling and feeding method, they cause a sacrifice in nutritional value, and therefore are very costly to manufacture and ship on a tonnage basis.

Therefore, feed producers continue to investigate ways to reduce cost. One management tool frequently used is providing supplements to the livestock which the livestock can self-feed. If the supplements can be self-fed, the livestock's nutritional needs most likely can be met, and labor cost can be greatly reduced. When the livestock becomes accustomed to eating self-feeding supplements, overeating by the livestock of the highly palatable feeds can become an issue. Many feed producers add limiters to the self-feeding supplements to regulate feed intake and reduce consumption. However, as the livestock becomes more accustomed to the limiter, the livestock becomes immune to its effectiveness, and more limiter will need to be added to the supplement to limit the intake to the desired intake level.

Accordingly, it may be desirable to provide a solid animal feed supplement in various forms such as dry grain, cubes, blocks and tubs produced having high-fat and high-protein content, with no additives. It may further be desirable to produce a final product as a solid animal feed supplement that has substantially the same nutritional value as the loose grain before it is initially fed into a system, such that the final product produced by the system does not sacrifice its nutritional value. It may also be desirable to provide high-fat and high-protein content feed supplement products that are produced only through mechanical manipulation. It may further be desirable to provide an animal feed supplement that regulates the livestock's consumption intake, without the addition of limiters.

SUMMARY

The present invention may satisfy one or more of the above-mentioned desirable features. Other features and/or advantages may become apparent from the description which follows.

An apparatus and method is configured to produce solid animal feed supplements formed as a tub or a block produced having high-fat and high-protein content, with no additives.

An apparatus and method is configured to prepare high-fat and high-protein content feed tubs or blocks through the use of only mechanical manipulation.

An apparatus and method is configured to prepare an edible feed supplement tub having a substantially uniform density throughout the entire product. The edible feed supplement tub has a texture that livestock can lick, and the high-protein content and high-fat content are evenly distributed throughout the tub. The uniform density is used to control the consumption rate of the product, without the addition of limiters. Each time the livestock licks the supplement, the livestock consumes approximately the same amount. Furthermore, the high-protein content delivers essential nutrients for building muscles and providing calories to the livestock. The high-fat content provides supplement to the livestock, which enables them to grow quicker by weight (weight-gain). This faster growth rate provides a higher market value, for example, in the beef industry in a shorter period of time in raising the livestock. The edible feed supplement tub contains no binders or fillers.

Various embodiments relate to a method of manufacturing such a feed supplement. One embodiment relates to an apparatus and method, which is configured to produce an animal feed supplement.

The apparatus and method is configured to produce an animal feed supplement having the highest protein and fat content. The animal feed is made from distiller grain and no binders or fillers are used. The apparatus and method produce a final product as a solid animal feed supplement that has substantially the same nutritional value as the loose grain before it is initially fed into a system, such that the final product produced by the system does not sacrifice its nutritional value. This produces essentially the same nutritional value that the loose grain possesses with an exception of a slight increase in the final fat (oil) content. This slight increase in final fat (oil) content, which is due to the testing process being unable to fully measure the moisture content of the comparative loose grain (DDG), will be described further below in reference to Tables 1 and 2. The final fat (oil) content of the treated grain after the extrusion process remains substantially the same or increases on a nutritional analysis basis as that of the initial fat (oil) content of the distiller grain before extrusion. This results in the highest protein-and-fat content animal feed product in comparison to the current market competitors.

In various embodiments, the high quality animal feed can be made in various forms, such as range cubes, calf cubes, mini-cubes, pellets, and supplement tubs.

An apparatus and method is configured to produce an animal feed supplement using an extruder that changes the mechanical properties and/or molecular structure of the animal feed composition during the process.

In various embodiments, one or more screws are included within the apparatus to create compression on the animal feed composition. The compression can be created through the use of a wide variety of different kinds of screws. The screw can have a variety of configurations.

For example, in some embodiments, the apparatus and method employs a screw installed within an extruder that is fully threaded screw and has a generally uniform root diameter throughout its length. In other embodiments, the screw may be configured having a non-uniform root diameter, for example, with radii of the roots of unequal size along its length. In another embodiment, the diameter of the roots may increase or decrease along the length of the screw. In these exemplary embodiments of the screw, the screw can create an increasing compression force on the treated material conveyed downward due to the rotation and physical characteristics of the screw.

In some embodiments, the apparatus and method contains the use of a series of intermeshed, flighted screws/augers. In some embodiments, such screws/augers may or may not have several compression zones where flights are positioned closer together. Alternatively or conjunctively, the flighting pitch may be positioned more perpendicular to the flow of the material through the screws. For example, the angle of the screw flight relative to the flow of the material through the screws may be in a range of approximately 45 degrees-90 degrees. In either of the screw and/auger arrangements, as the screws rotate, mechanical heat from shearing and compressing of the distiller grain, such as dry distiller grain, from the intermeshed flights simultaneously causes a physical property change in the dry distiller grain. This physical property change causes the grain to change from a non-compressible state to a compressible state. Before the extrusion process, the material is in the non-compressible state such that it cannot be compressed. After undergoing the extrusion process, the material can be compressed.

In some embodiments, the intermeshed screws provide both perpendicular compression and lateral compression. For example, the perpendicular compression is created by forcing the feed material through a section of the screw having tighter cavities of the flights and roots of the screw. The lateral compression can be created by conveying the material through sections of the screw wherein the number of flights and/or pitch of the flights are varied.

An apparatus and method that produces high protein feed without the addition of additives is provided in various embodiments.

In various embodiments, the apparatus and method disperses animal feed composition into a container, such as a feed tub, and compresses the composition such that it solidifies within the feed tub to produce a solid feed supplement tub.

Various embodiments provide an anti-spill, solid feed supplement tub.

Various embodiments provide a feed tub having expandable panels that expand during the compression process.

Various embodiments provide a feed tub having a configuration that includes various rib patterns to reinforce the side walls.

Various embodiments provide a feed tub wherein the animal feed composition is mechanically compressed into the ribs of the side walls such that the feed solidifies rigidly within the grooves of the ribs of the feed tub.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

FIG. 2G shows a perspective view of the screw assembly illustrating compressed grains at the plurality of flights and roots at the middle sections of the first screw and the second screw in accordance with the present teachings.

FIG. 5F shows a compression press system with the hydraulic ram in an upward position above the feed tub before compression according to the present teachings.

FIG. 9 is a flow diagram for producing the solid feed block according to the present teachings.

DETAILED DESCRIPTION OF VARIOUS EMBODIMENTS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" mechanism+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. While embodiments of the present technology are described herein primarily in connection with a solid animal feed, the concepts are also applicable to other animal feed products, such as dry grain, cubes, range cubes, calf cubes, mini-cubes, pellets, or any other suitable animal feed product.

Figure 1:
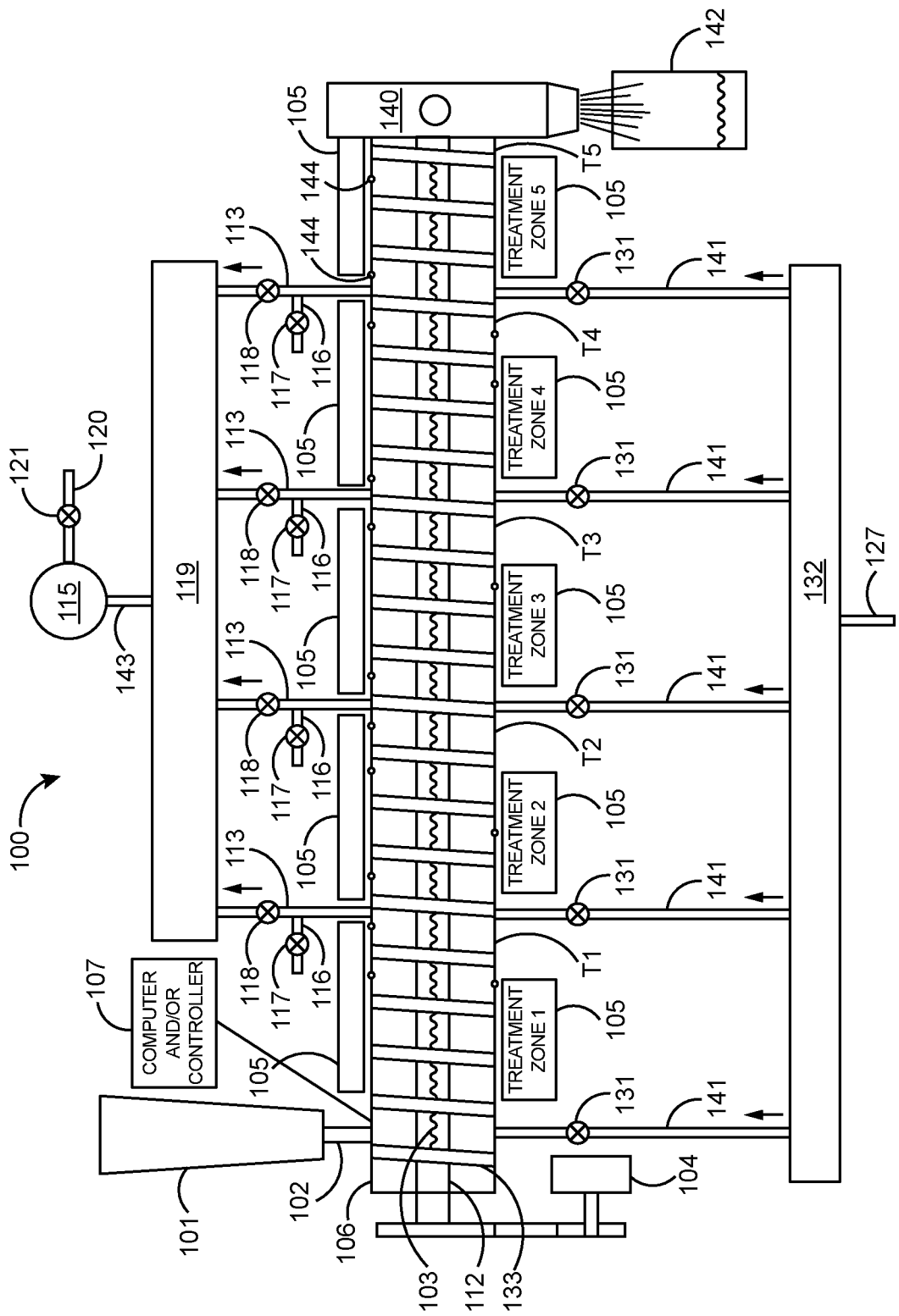
FIG. 1 is a schematic drawing of an apparatus for bulk material where an extruder screw conveys and compresses the material as it passes through a plurality of treatment zones.

An exemplary embodiment of the apparatus 100 that can be used, for example, to prepare an animal feed according to the present teachings is illustrated in FIG. 1. FIG. 1 illustrates a schematic diagram of an exemplary extruder where an animal feed composition in the initial form of distiller grain material is processed into a final product. In the preferred embodiment, the distiller grain consists of dried distiller grain (DDG). However, in some embodiments, different forms of distiller grains, for example, wet, or modified wet distiller grains, may be employed in various embodiments of the present teachings. Typically, wet distiller grain contains primarily unfermented grain residues (protein, fiber, fat and up to 70% moisture). In some applications, the wet distiller grain has a moisture content as high as 75% and, in other applications, the moisture content of the wet distiller grain may be higher but no more than 90%. Modified wet distiller grains may have a moisture content of approximately 50% to 55%. Dried distiller grains may have a moisture content of approximately 10% to 12%.

The premixed ingredients of the animal feed composition may include, for example, 100% distiller grains, wherein no binders or fillers are used to produce the high protein and high fat animal feed products. The high fat and high protein are achieved through mechanical manipulation of the ingredients without the addition of any binders or fillers.

One of the advantages of the present invention is, as a result of the compression and release process described below, the production of a solid animal feed supplement that has substantially the same nutritional value as the loose grain (DDG) before it is initially fed into the system. Thus, the final product produced by the system does not sacrifice its nutritional value. The testing data reveals that the system produces essentially the same nutritional value that the loose grain possesses with a small increase in the final fat (oil) content detected on a dry basis analysis of the feed. The rationale for the small increase in the final product fat (oil) content will be described below and in reference to Tables 1 and 2. In the present invention, the small increase in fat (oil) is not due to the inclusion of any additives to the grain while being processed by the system 100. Rather, the increase is due to the testing process being unable to fully measure the moisture content of a feed material when in its initial form of loose grain (DDG) as described above.

Therefore, the final fat (oil) content of the treated grain after the extrusion process remains substantially the same or slightly increases on a nutritional analysis basis as that of the initial fat (oil) content of the distiller grain before extrusion. This results in the highest protein-and-fat content animal feed product in comparison to the current market competitors, because the final product is produced without any sacrifice in terms of nutritional value. The resultant product contains, for example, approximately 50% more of fat and approximately 30% more of the protein in comparison to current competitors. The resultant product produced as a result of the present teachings contains approximately in the range of 25%-35% of protein, preferably 30%, and in the range of 8%-16% of fat (oil), preferably 12%, on a dry basis analysis. In comparison, the final feed product of typical competitors contains about 20% protein and about 6% fat (oil) content on a dry basis analysis.

EXAMPLES

The invention will be further clarified by the following Examples, which are intended to be purely exemplary of the invention and should not be construed as limiting the scope of the invention in any way.

Example 1

Table 1 shows an example that illustrates a feed material when in its initial form of loose grain (DDG) before being fed into the system.

TABLE 1

|  | Analysis As Received | Analysis Dry Basis |
|---|---|---|
| Moisture, % | 8.80 | 0.00 |
| Dry Matter, % | 91.20 | 100.00 |
| Crude Protein, % | 28.1 | 30.8 |
| Acid Detergent Fiber, % | 11.3 | 12.4 |
| Total Digestible Nutrients, % | 73.6 | 80.7 |
| Net Energy Maint, MCal/cwt | 81.23 | 89.07 |
| Net Energy Gain, MCal/cwt | 54.41 | 59.66 |
| Net Energy Lact, MCal/cwt | 76.84 | 84.26 |
| Calcium, % Ca | 0.02 | 0.02 |
| Phosphorus, % P | 0.78 | 0.85 |
| Potassium, % K | 0.98 | 1.07 |
| Magnesium, % Mg | 0.30 | 0.33 |
| Sulfur, % S | 0.64 | 0.70 |
| Fat (Oil) % | 11.4 | 12.5 |

Example 2

Table 2 shows an example that illustrates the production of a final product of an animal feed supplement in Range Cube form after the loose grain is fed into the system and prepared according to the present teachings.

TABLE 2

|  | Analysis As Received | Analysis Dry Basis |
|---|---|---|
| Moisture, % | 8.99 | 0.00 |
| Dry Matter, % | 91.01 | 100.00 |
| Crude Protein, % | 27.7 | 30.5 |
| Acid Detergent Fiber, % | 10.9 | 12.0 |
| Total Digestible Nutrients, % | 73.8 | 81.1 |
| Net Energy Maint, MCal/cwt | 81.57 | 89.63 |
| Net Energy Gain, MCal/cwt | 54.74 | 60.14 |
| Net Energy Lact, MCal/cwt | 77.10 | 84.71 |
| Calcium, % Ca | 0.05 | 0.05 |
| Phosphorus, % P | 0.79 | 0.87 |

TABLE 2-continued

|  | Analysis As Received | Analysis Dry Basis |
| --- | --- | --- |
| Potassium, % K | 0.98 | 1.08 |
| Magnesium, % Mg | 0.31 | 0.34 |
| Sulfur, % S | 0.64 | 0.71 |
| Fat (Oil) % | 12.7 | 14.0 |

In the Examples in Tables 1 and 2 above, "As Received" and "Dry Basis" tests were performed, because most feed labs report analysis on both a wet and a dry basis. The wet basis is commonly referred to by the terms: As Is, As Fed or As Received. The dry basis is usually referred to as: Dry, DM, Dry Basis or Dry Result.

However, in the feed industry, when diets are formulated for livestock, analysis results quoted on a "Dry Basis" are used. Forage quality results are also normally quoted on this basis. Therefore, for the purpose of this discussion, only a comparison of the "Dry Basis" analysis between the loose grain (DDG) and the final product in range cube form regarding the protein content and increase in fat (oil) content will be discussed.

Table 1 shows the loose grain (DDG) before entering the system as having a protein content on a dry basis of substantially 30.8% and a fat (oil) content on a dry basis of substantially 12.5%. Table 2 shows the final product exiting the system in the form of a Range Cube as having a protein content on a dry basis of substantially 30.5% and a fat (oil) content on a dry basis of substantially 14%.

In comparison to Table 1, Table 2 shows a small increase of fat (oil) on a dry basis. Namely, the fat (oil) content in Table 1 is 12.5%, and the fat (oil) content in Table 2 is 14.0% on a dry basis. The fat (oil) content of 14.0% in Table 2 is about 112% of the fat (oil) content of 12.5% of Table 1, within a range of +/−5% as defined above. The preferred range of the final product fat (oil) content, on a dry basis, is about 112% to about 116% of the initial fat (oil) content. In the present invention, the slight increase in fat (oil) on a dry basis is not due to the inclusion of any additives to the grain. This contrasts with the common industry practice of adding additives to prepare solid feed supplements, such as cubes, pellets, blocks, and tubs.

Rather, the small increase in fat (oil) content on a dry basis is due to the testing process being unable to fully measure the moisture content of the loose grain (DDG). In actuality, the initial fat (oil) content of the loose grain is substantially equivalent to the fat (oil) content of the final product of the range cube. The moisture content of the loose grain measured by the laboratory is not completely accurately. The difference in the data in Tables 1 and 2 reveals that the lab equipment has limited capability to squeeze free liquid or moisture from the material when it is in loose grain form.

In the example in Table 1, tests were conducted to squeeze the loose grain material to determine whether liquid such as fat (oil) can be separated from the material. As demonstrated in the example, the laboratory equipment cannot squeeze the feed material in "loose" grain form to obtain a moisture content (fat (oil)) greater than 12.5%. This is because the pressure applied by the lab equipment alone cannot break loose the molecular bond of the loose grain to reveal the additional liquid contained therein. To break loose the molecular bond to further separate the liquid (fat (oil)) content from the material, it takes a physical property change or chemical change caused by either heat or a chemical reaction. The physical property change rearranges the same atoms or molecules. The chemical change breaks down the molecular bonds.

According to the present invention, when the loose grain (DDG) is fed into the system 100, it undergoes a physical property change caused by the extruder that is uniquely designed according to the present teachings to squeeze and transform the loose grain (DDG), which expels or releases more oil from the material, as the system produces the final product of the range cube. The laboratory analysis is capable of measuring the released fat (oil) from the range cube and not the fat (oil) within the loose grain form. This reveals an increase in fat (oil) content in the data of the range cube on a dry basis analysis as shown in Table 2 although no additives were added to prepare the range cube. Thus, the data supports the postulate that the percentage of fat (oil) content of the loose grain (DDG) entering the system in comparison to the fat (oil) content of the final product of the range cube does not change appreciably. Thus, the final feed products produced according to the present teachings include no additives.

It should be further emphasized that the test results for solid feed tubs, which are also produced according to the present teachings, as described below, yield values substantially equivalent to the test results of the Range Cube shown in Table 2 above. Thus, for the purpose of this discussion, the fat (oil) content, protein content, and other constituents of the range cube and solid tubs are considered having substantially equal values as shown in Table 2.

An exemplary embodiment of a system that can be used, for example, to produce a high-fat and high-protein animal feed supplement, which may include, for example, a feed tub, is illustrated in FIGS. 1-10F. Referring to FIG. 1, the apparatus 100 can provide a loading zone for example, a hopper 101, for loading the bulk material into the apparatus 100. Material supplied from hopper 101 in loose granular form is fed into the inlet chute 102 of the of an extruder 112. One example of an extruder that can be employed within apparatus 100 is a compression screw 112. In some embodiments, other types of screws can be used having one or more compressive sections, non-compressive sections or a combination of both distributed along the length of the screw.

Figure 2B:
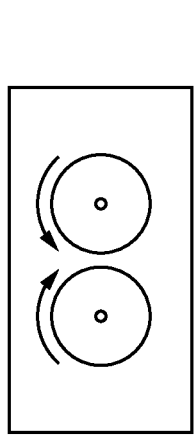
FIG. 2B is another exemplary embodiment of two parallel screws rotating counter towards each other in the extruder used in the apparatus of FIG. 1.
Figure 2C:
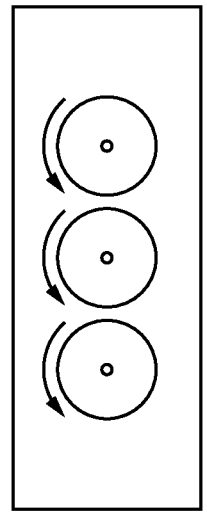
FIG. 2C is another exemplary embodiment of three parallel screws rotating in the same direction in the extruder used in the apparatus of FIG. 1.
Figure 2A:
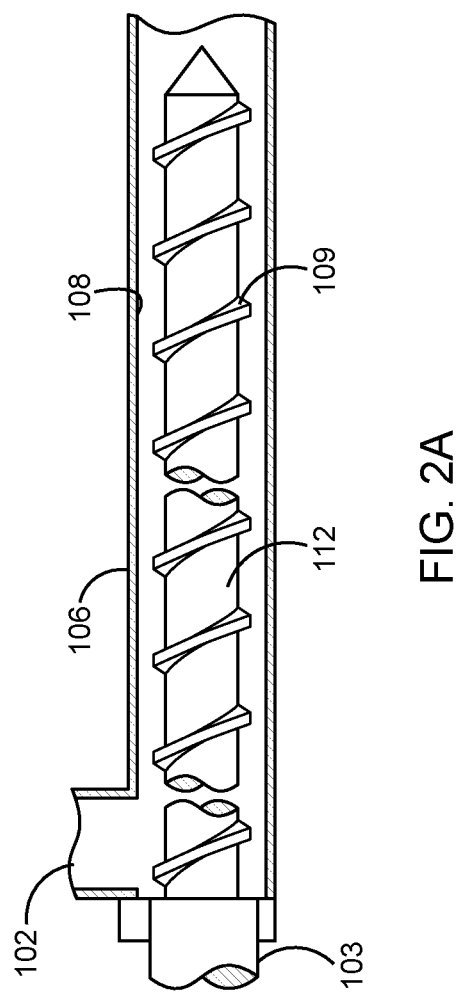
FIG. 2A is a side view of the general shape of the extruder used in the apparatus of FIG. 1.
Figure 2D:
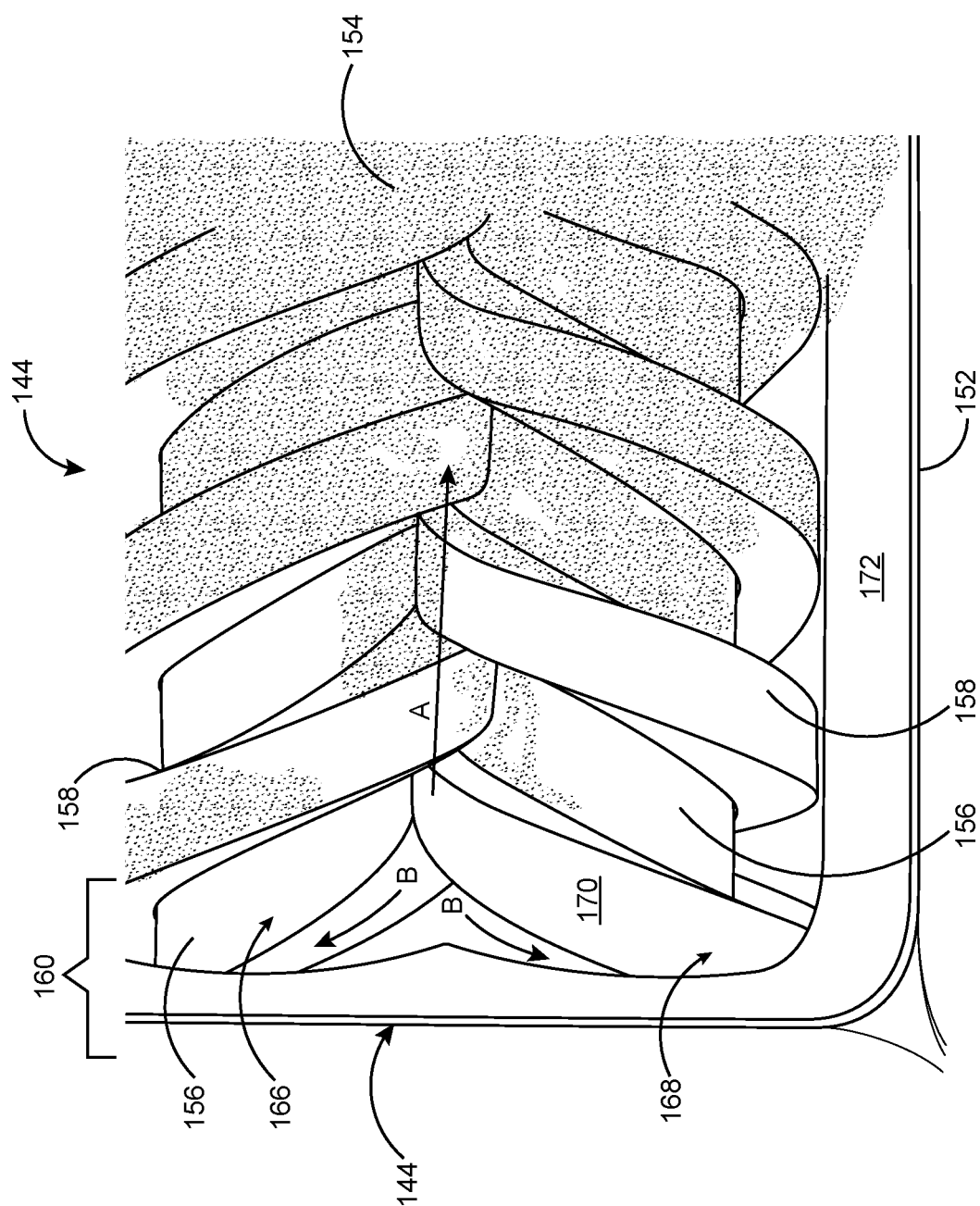
FIG. 2D shows a perspective view of a screw assembly of the animal feed producing system according to the present teachings.
Figure 2E:
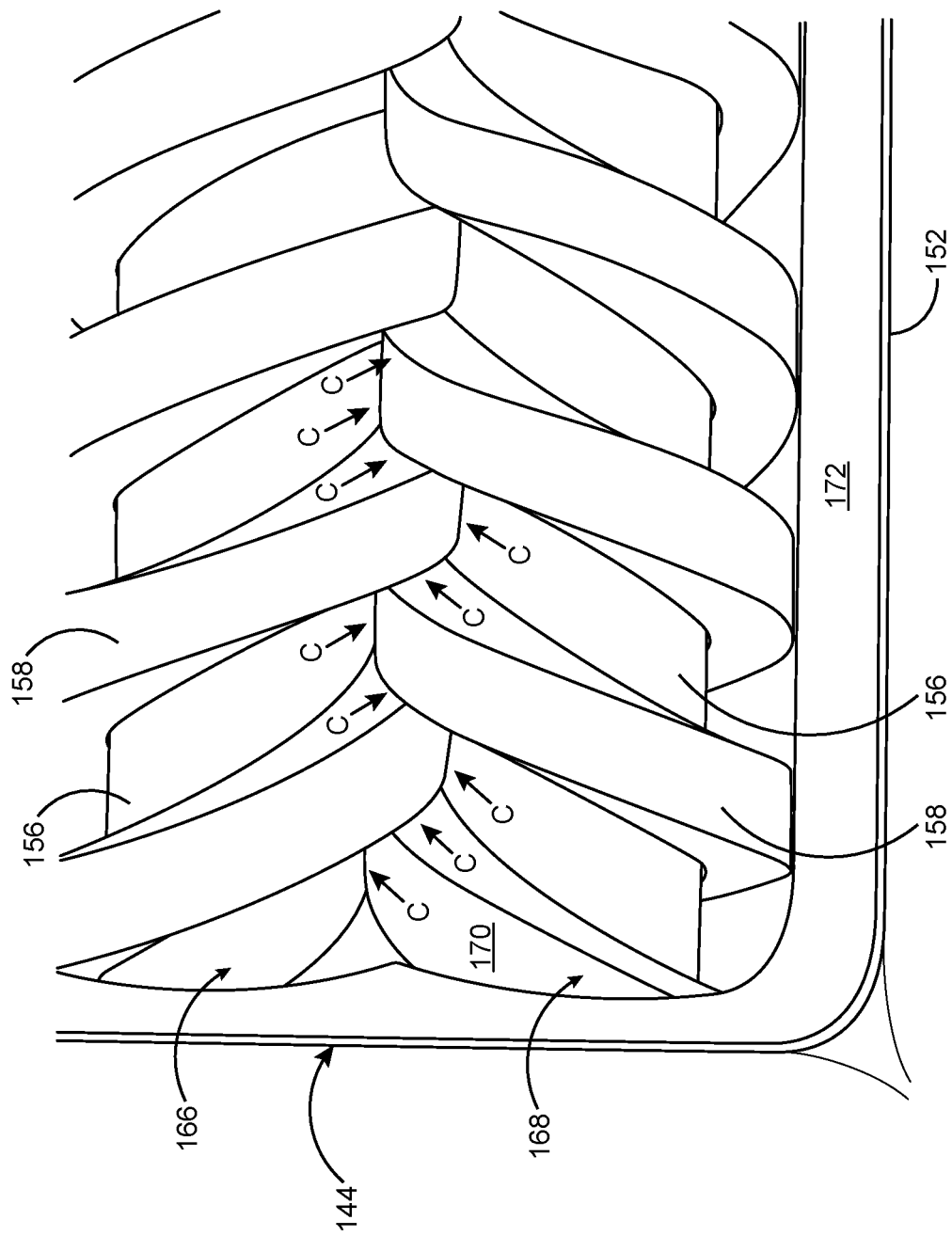
FIG. 2E shows a perspective view of the screw assembly of the animal feed producing system, illustrating a plurality of flights and roots of a first screw and a second screw in accordance with the present teachings.

In various embodiments, the apparatus 100 can be configured having several differing compression screws with differing structures or geometries that create compression on the treated material. For example, in various embodiments, the apparatus 100 may include one or more screws. FIGS. 1 and 2A-2E depict various exemplary embodiments of compression screws that can be employed in apparatus 100. In various embodiments, the screws are configured such that the treated material may experience a repetitive pattern of "on-off-on-off" compression and shearing cycles applied to the treated material as the treated material is conveyed from the inlet to the outlet of the screws. FIGS. 1 and 2A depict a single compression screw. FIG. 2B illustrates a dual or twin screw. FIG. 2C depicts a triple compression screw. FIG. 2D illustrates intermeshed screws. FIG. 2E illustrates two intermeshing screws and depicts the compression and shearing points between the screws. Those skilled in the art would recognize that a single screw, a plurality of screws, or a combination of a variety of screws may be used to compress the treated material.

In various embodiments, the size and shape of the compression screw may vary depending on the particular application. For example, in some embodiments, the compression screw may be a fully threaded screw that has a generally uniform root diameter throughout its length, as best depicted in FIGS. 1 and 2A. In other embodiments, the compression screw may be configured having a non-uniform root diameter, for example, with radii of the roots of unequal size along its length. In another embodiment, the diameter of the roots may increase or decrease along the length of the screw.

FIG. 2A illustrates, according to one exemplary embodiment, the general shape of the profile (radius) of a single compression screw shown in FIG. 1. In this exemplary embodiment, the compression screw is configured such that the flight profile radius is uniform along its entire length. Those having skill in the art would understand, however, that other screw arrangements having multiple screws can be used to convey and compress the treated material.

In various embodiments employing a twin or multiple-screw extruder, the screws can rotate in the same direction (co-rotating) or opposite direction (counter-rotating), with one or more segments of fully intermeshing flights, non-intermeshing flights or a combination thereof. In some embodiments, such extruders may be modular, and the screw design can be changed by rearranging the feeding, venting, and mixing elements along the screw shaft. For example, in lieu of or in addition to the single screw in FIGS. 1 and 2A, compound rotating screws can be employed having multiple screws, such as dual or twin screw elements, that rotate in a counter rotating direction as shown in FIG. 2B or triple screws that rotate in the same direction (co-rotating) as shown in the FIG. 2C. In the embodiments employing multiple screws, the treated material may be fed into the inlet of the housing thereby entraining the treated material between the rotating screws and then moving the treated material downward and out of the housing, as the screws rotate.

In some embodiments, the apparatus 100 employs a set of twin intermeshed screws having various mixing zones as depicted in FIGS. 2D-2I and FIGS. 10A-10F. In other embodiments, a ring screw (not shown) having individual, closely intermeshed, coaxial screws, which are arranged in an annulus, can be used to provide mechanical agitation very similar to the co-rotating closely intermeshing twin screw extruders. In such an embodiment, the screw can be designed wherein each section has uniquely different sets of flight geometry to perform specific compression functions. For example, sections of the screw geometry can be configured to create perpendicular compression, lateral compression, or a combination thereof. Perpendicular compression can be created by forcing the treated material through tighter cavities of the flights and roots of the screw. Lateral compression can be created by employing a screw configured to have changes within different sections to the number of flights and/or the pitch of the flights.

As the grain advances through the twin screws, the grain may encounter several alternating stages of compression and release. In general, the repeated compression and release as the grain transitions between sections of the multiple screws having different numbers of flights and/or pitches generates substantial shear stress on the grain. The edges of the plurality of flights and roots are intentionally designed to be very distinct and sharp so that they can shear the grains into a very fine particulate or granules. Shearing is the most effective way to apply heat to the grains, because it self-generates heat during the process. The compression and release processes may be performed repeatedly at a series of successive stages as the grain travels through the extruder. In some embodiments, the compression and release processes may be performed at random and/or uniform intervals as the grain advances through the grain processing system.

As illustrated in the exemplary twin screw embodiment of FIG. 2D, the compression screw assembly 144 includes a plurality of screws 166, 168 and a plurality of barrels 152. In the preferred embodiment, the plurality of screws 166, 168 includes a first screw 166 and a second screw 168. The first and the second screws 166, 168 include, as shown in FIGS. 2D and 2H, a feed section 160, a plurality of middle sections 162, 164 and a tip section (not shown). The feed section 160 is adaptable to receive the grains 154 from the feeding hopper (not shown). The feed section 160, the plurality of middle sections 162, 164 and the tip section (not shown) include a plurality of flights 158 and a plurality of roots 156. The flights 158 are the section of the screws 166, 168 that pushes the material as the screw rotates. The roots 156 are located in the flow channel of the screws 166, 168.

According to one example, the first screw 166 and the second screw 168 rotate in a counter clockwise direction which creates a positive displacement pump that enables the grains 154 to move forward in relation to the plurality of screws 166, 168 from the feed section 160 to the tip section and allows the grains 154 to be positioned in constant contact with the hot surfaces 170, 172 of the plurality of screws 166, 168 and barrels 152, respectively. The moisture present in the grains 154 is trapped within the grain, which helps to provide lubricity in the grains. The presence of the moisture trapped at a high temperature creates a lubrication property that enhances the grains ability to flow when the grains 154 pass through a reduced surface area between the plurality of flights 158 and the plurality of roots 156. The dry grains are sheared utilizing the sharp edges of the plurality of flights 158 and the roots 156.

As illustrated in FIGS. 2D-2I, the screws 166, 168 are designed such that each includes uniquely different set of flight geometries to perform specific compression functions. FIG. 2D illustrates the feed section 160 where the grains 154 are fed into the point of origin in the flights 158 of the screws 166, 168 installed within a twin screw assembly 144. The flights 158 are the ridges of the screws 166, 168, and the roots 156 are the bottom portions created between the flights 158 of the screws 166, 168. In this example, the screws 166, 168 rotate in a counter rotating direction indicated by the solid-line arrow B (in FIG. 2D) which advances the grain 154 in a forward direction as shown by the solid-line arrow A in FIG. 2D.

In other embodiments, the screws 166, 168 may co-rotate relative to each other. In some embodiments, the system 100 may be designed to include multiple sets of screws. For example, the system may be configured to include a set of screws that counter-rotates and another set of screws that co-rotates. In this exemplary screw assembly 144, the screws 166, 168 are positioned such that their flights are parallel to each other so that one flight 158 from one screw 166 is situated very tightly between two flights 158 from the other screw 168.

When positioned, timed, and rotated, for example, in a counter clockwise direction, this configuration, as the screws rotate, enables the grain 154 to be forced and compressed in several areas located on the flights and the roots of the screws, as illustrated in FIGS. 2D-2I. This creates a positive displacement pump that enables the grains 154 to move forward in relation to the plurality of screws 166, 168 from the feed section 160 to the tip section and allows the grains 154 to be in constant contact with the hot surfaces 170, 172 of the plurality of screws 166, 168 and barrels 152 respectively. The moisture present in the grains 154 is trapped within the grains which enhances the lubricity of the grains 154 as it passes through a reduced surface area between the plurality of flights 158 and the plurality of roots 156.

Figure 2F:
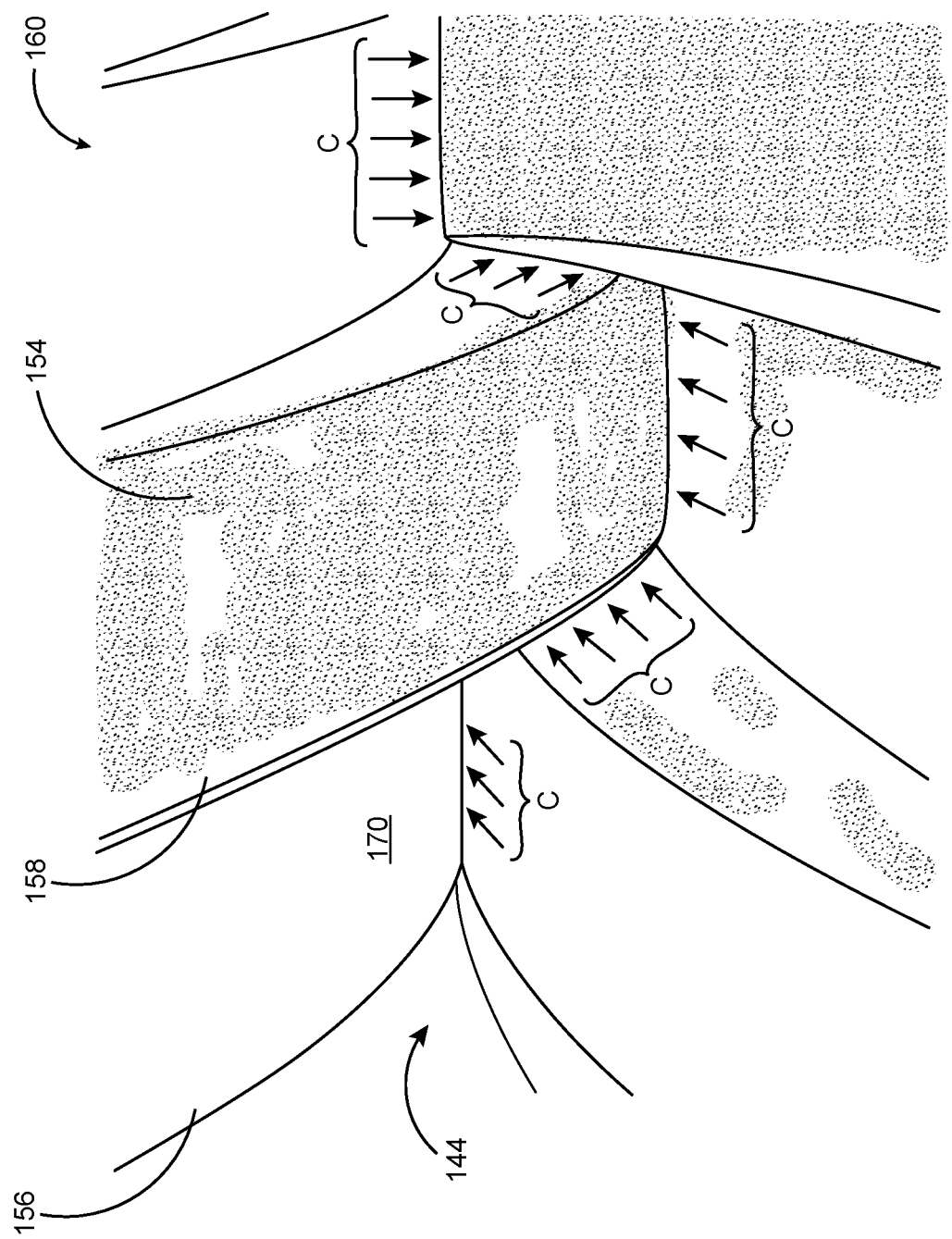
FIG. 2F shows a perspective view of the screw assembly illustrating grains passing through a feed section of the plurality of screws in accordance with the present teachings.
Figure 2H:
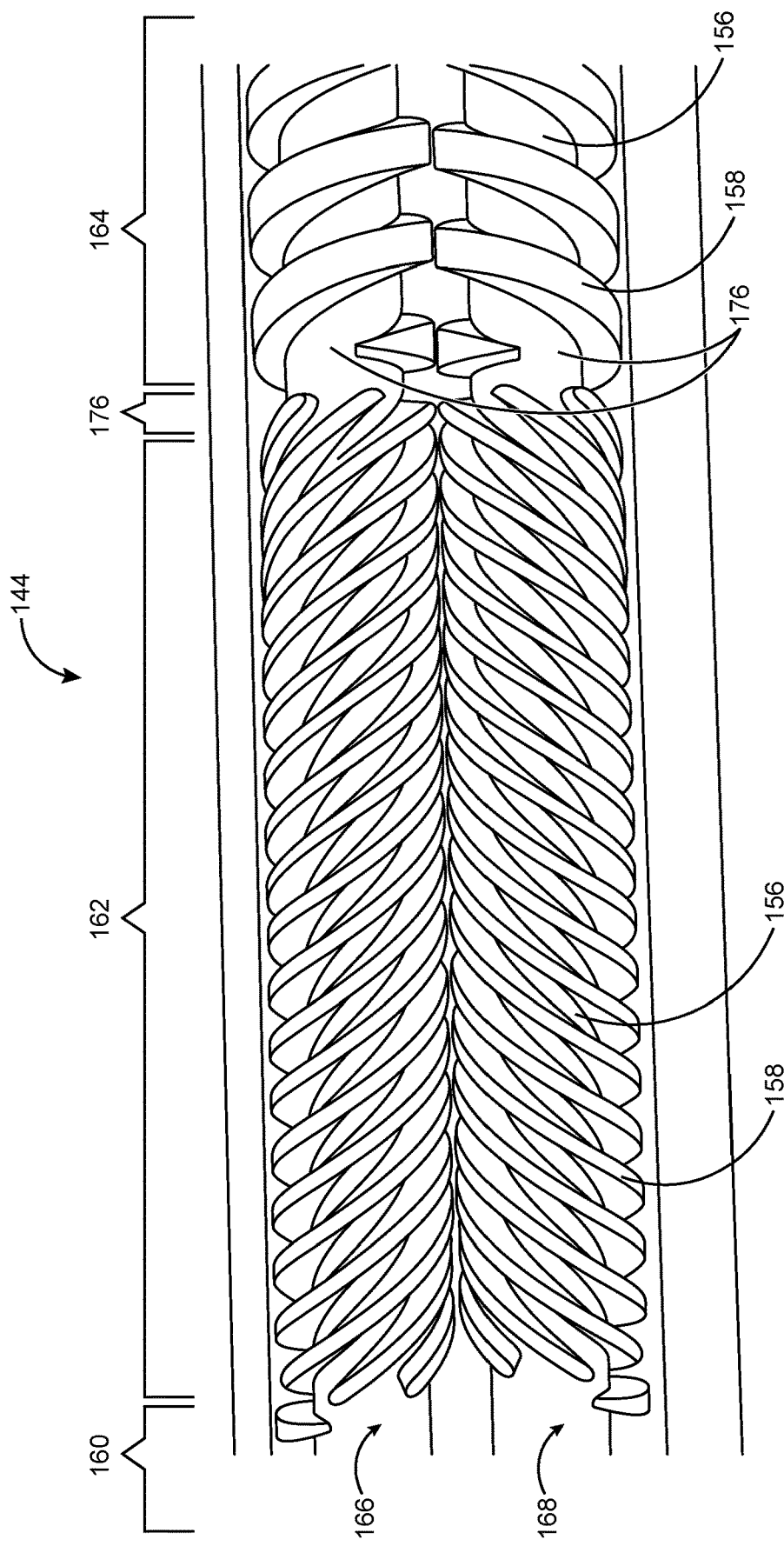
FIG. 2H shows a perspective view of the screw assembly illustrating the feed section and a plurality of middle sections in the plurality of screws in accordance with the present teachings.

As is shown in more detail in FIGS. 2E-2G, the grains 154 are forced and compressed in several converging areas (indicated by the solid-line arrow C) located on the flights 158 and the roots 156 of the screws 166, 168. The compression is created by the reduced surface between the plurality of flights 158 and the roots 156. The edges of the flights 158 and roots 156 entrap the grain 154 within the area indicated by arrow C. As the grains 154 get compressed between the flights 158 and the roots 156, a perpendicular compression (perpendicular to the flow of material which is from the feed section 160 to the tip section (not shown) of the screws 166, 168) is created. This perpendicular compression derives at least two beneficial effects (by design) on the material. First, one benefit is that it creates a mechanical compression, which in turn generates mechanical heat that directly applies heat to the grains 154. Secondly, the perpendicular compression changes the mechanical properties of the grains 154, thereby making fine granules of the grains 154 that are substantially modulus such that these granules can be pushed into smaller orifices of die(s) (not shown) located downstream from the tip section (not shown) of the screws 166, 168. Namely, the grains should be sufficiently fine so as to flow like a fluid. Further, this granule sized grains are bound into a dense form. In addition, each time the grains are compressed by the screws, air present in the grain is removed. This removal of air is one of the factors that allow the grains to be compressed into a more condense form in the die.

The edges of the plurality of flights 158 are intentionally designed to be very distinct and sharp so that they can shear the grains into a very fine particulate. Shearing is an effective way to apply heat to the grains 154, because it self-generates heat during the process. An additional advantage of the animal feed producing system 100 is that, the plurality of screws 156, 158 rotates at higher rotation per minute (RPM) which increases the shear rate at an exponential rate by design which in turn reduces the operating cost of applying heat as well as breaks down the particulate to make it more compressible and bindable.

FIG. 2H illustrates an example of the compression and release stages as the grain transitions between sections of the multiple screws having different numbers of flights and/or pitches that generate substantial shear stress on the grain. Specifically, FIG. 2H illustrates a transition section from the feed section 160 to a more aggressive first middle section 162 (compression stage) to a less aggressive middle section 164 (release stage). In this transition section, more compression and shearing force occurs because more flights 158 are included per linear inch. This causes increased compression force and generates the production of more heat. Also, a backup region 176 is provided while the grain 154 is transitioning from this first middle section 162 (compression stage) to the second middle section 164 (release stage). The backup region 176 causes a backup of grain flow which creates lateral compression in the material similar to the compression created by forcing the grain through the smaller orifices in the die(s). In the backup region 176, the grain slows down, because of the transition and grain backs up in the flow creating the lateral compression. As the grain advances to the less aggressive middle section 164 (release stage), the grain encounters less aggressive compression because fewer flights are provided within this section.

Figure 2I:
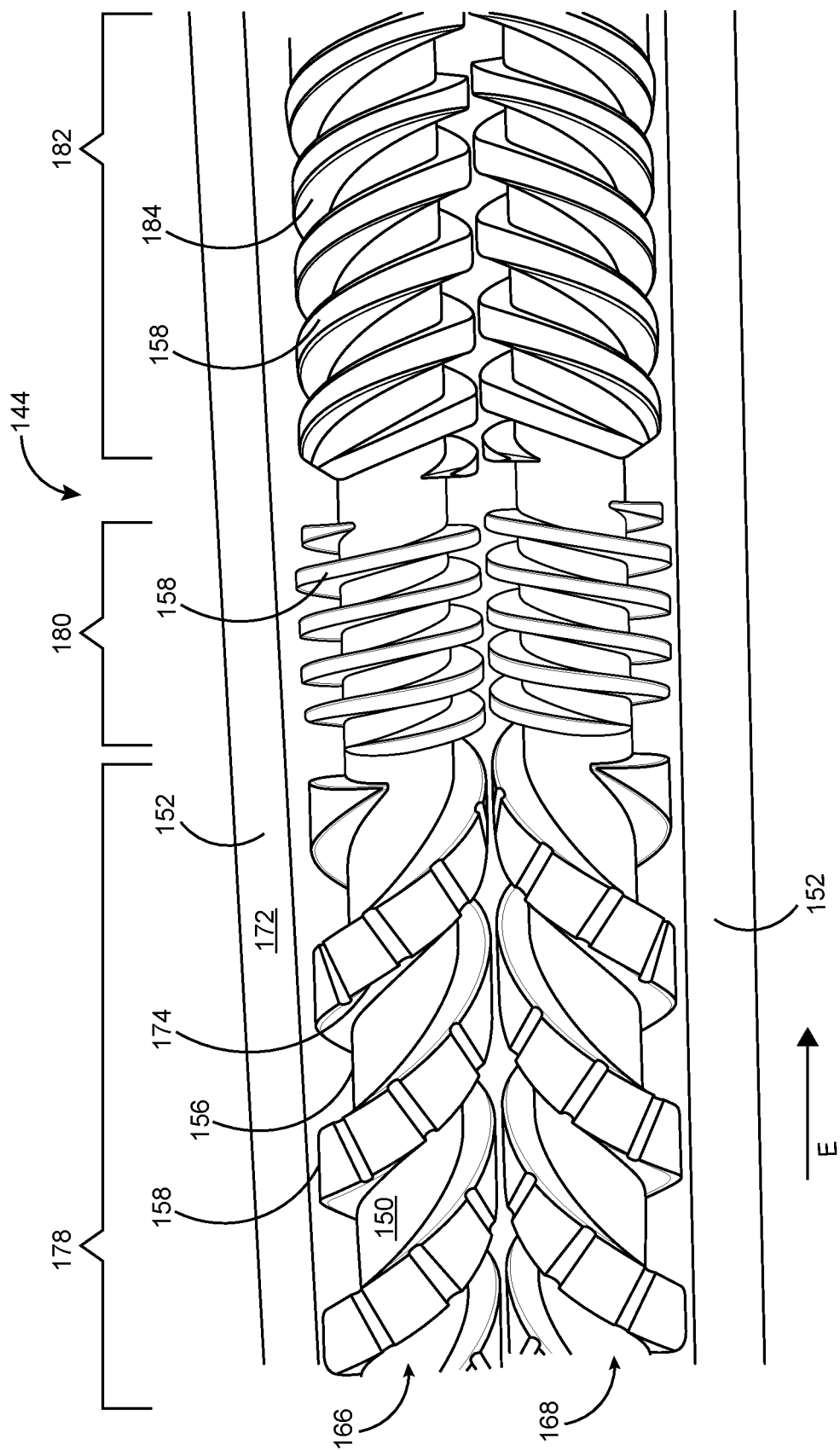
FIG. 2I shows a perspective view of the screw assembly illustrating different set of flights and roots in the first and second screws of the animal feed producing system in accordance with the present teachings.

FIG. 2I illustrates another example of lateral compression provided by the design of the screw. In FIG. 2I, the screws 166, 168 are designed such that there are changes in the number of flights and changes in the flight pitch. In FIG. 2I, there are transitions from section 178 having fewer flights 158 spaced apart with a more forward angle of pitch 174 to an intermediary section 180, then to a section 182 having more flights 158 with a far less forward pitch 184. At the intermediary section 180, the grain 154 experiences less flow and more compression forces applied onto the grain 154. At section 182, the flow of the grain increases. The transition from sections in the screws 166, 168 comprising different number of flights and flight pitches is another form of creating lateral compression. This compression force applied onto the grain is produced as a result of the screw design. Thus, the lateral compression can be performed onto the grain at regions of the screw which has nothing to do with having a conventional die with restrictive orifices positioned downstream from the plurality of screws 166, 188.

In FIG. 2I, as the grain travels through the points of compression, initially, the grain flows faster through section 178, because the angle of pitch 174 is the most forward. Next, the grain slows down to its slowest speed through section 180, because the angle of pitch is the least forward. Then, the grain speeds up through section 182, but at a rate slower than in section 178, because the angle of pitch 184 is less forward than the angle of pitch 174. On the other hand, the material flows through section 182 faster than section 180, because the angle of pitch 184 is more forward than the angle of pitch 186.

FIGS. 10A-10F depict a variety of exemplary compression screws having various mixing zones and/or compression and release stages which can be used alone in a single screw extruder or in combination with each other in a multiple-screw extruder. For example, the exemplary compression screws shown in FIGS. 10A-10F may be designed to include one or more segments as follows: single pitch, single flight; short pitch, single flight; half pitch, single flight; long pitch, single flight; variable pitch, single flight; double flights, standard pitch; tapered, standard pitch, single flight; single cut-flight, standard pitch; and single flight ribbon.

As illustrated in the exemplary embodiment of FIG. 1, the screw of the extruder can be driven by a variable speed motor 104 that drives the screw element 103 of the extruder 112. The treated material in the form of loose grain, such as dried distiller grain bulk material, entering the extruder at chute 102 may have a moisture content in the range of about 70-80% by weight. As the material is conveyed downward within the extruder 112, heat may be added to the material by one or more heaters 105 along one or more zones of the wall 106 of the barrel of the extruder. In some embodiments, at least one non-heating zone may be provided in the extruder such that no heater applies additional heating to the treated material. In other embodiments, the extruder may be designed having no heaters.

In the embodiments employing more than one heater, such as the example in FIG. 1, the heaters 105 can be arranged in a plurality of treatment zones where the individual heaters can be equipped with independent heater controls for creating separate treatment zones where desired temperatures are maintained in the treated material as it is conveyed down the extruder 112. While five heaters zones are shown in FIG. 1, the number of actual heater zones employed could be greater or less than the five shown depending on the heating requirements of the treated material and the design requirements of a particular system. The heater device can be, for example, electric heaters, combustion gas heaters, microwave heaters, steam heaters that are heated by hot fluid(s), solar powered heaters or any combination of these or any other suitable heating devices.

In some embodiments, a venting line 113 may be provided at one or more treatment zones. In other embodiments, a venting line may not be provided within the system. In the exemplary venting line embodiment, one end of the vent line 113 connects to an end of a treatment zone and the second end of vent line 113 connects to a vacuum pump manifold 119. The manifold 119 connects to a vacuum pump 115 through line 143. An exhaust line 116 is provided, between the inlet of the vacuum pump manifold 119 and the first end of vent line 113, to vent vapor and gases from the treatment zones when it is not desirable to vent the treatment zones through the vacuum pump manifold. When the decision is made to exhaust the treatment zones via the exhaust line 116, valve 118 at the inlet to vacuum pump manifold 119 will be closed and valve 117 will be opened. The vacuum manifold 119 connects to the second ends of vent tubes 113 where each zone can be arranged to selectively have vacuum applied to a treatment zone or each treatment zone can be individually vented through lines 116 under the control of valves 117.

During the operation, the temperature maintained in the treatment zones can be controlled in each successive treatment zone to evaporate the liquid contained in the treated material. The required temperature to be maintained in each of the treatment zones will depend on the material being treated and the boiling temperature of the material being treated. For example, when water is the liquid targeted to be evaporated from the treated material, the temperature in the treatment zone needs to be at least 212° F. at atmosphere pressure of 14.7 psi. Should a vacuum be introduced in the treatment zone, the evaporation temperature of water will be less than 212° F. In the case of distiller wet grain (WDG), the evaporation of the liquid component may produce condensed dissolved solids (CDS) which is a very beneficial nutritional component that may be added to the final distiller dried grain (DDG) product. The system 100 shown can be arranged, in some embodiments, to terminate all vacuum and venting to the treatment zones while only heating is applied to the material. Any vapor generated in the treatment zones under this mode of operation can be exhausted through the terminal end 140 of the extruder, the venting line 113, or a combination of both.

Figure 3:
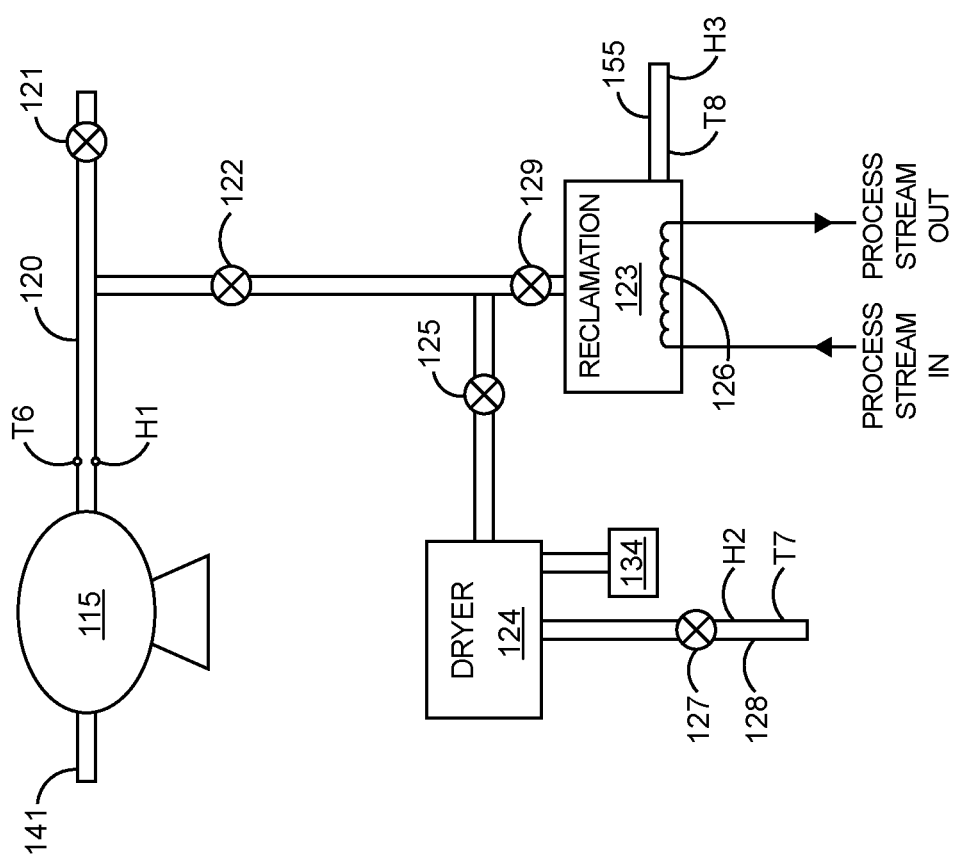
FIG. 3 is a schematic drawing of the details of the gas handling system for the apparatus of FIG. 1 including an optional drying air recirculation system and an energy reclamation system.

FIG. 3 illustrates an optional embodiment of the device including a drying air recirculation system 124 and an energy reclamation system 123. Essentially, the drying air recirculation system 124 can be seen as an optional add-on to the apparatus 100 that supports and enables drying and recirculation of exhaust gases. FIG. 3 shows a vapor and gas handling system where the exhaust gas and vapors entering vacuum pump 115 from line 143 may be vented to ambient through line 120 and valve 121. Given that the gases and vapors drawn out of the extruder at each successive treatment zone may have been supplied with a considerable amount of heat by the heaters 105, it may be beneficial to the overall efficiency of the process if some of the heat in these exhaust gases is reapplied to the drying process. Optionally, these gases may be utilized to further enhance the overall efficiency of the system by and recirculating exhaust gases from the vacuum pump 115 to the treatment zones or using the exhaust gases in an energy reclamation system. In such embodiments, to utilize the exhaust gas drying and recirculation system 124, valves 121 and 129 are closed or throttled and valves 122 and 129 are opened permitting exhaust gases and vapors discharged from vacuum pump 115 to be directed to the recirculating air drying system 124. To utilize the energy reclamation system 123, valves 121 and 125 are closed and valve 129 is opened permitting exhaust gases to be directed to energy reclamation device 123. To simultaneously utilize both the recirculation exhaust gas drying system and the energy reclamation systems, valves 122, 125 and 129 are opened and valve 121 is closed or throttled.

When the closed circuit dryer, in FIG. 3, is in operation, exhaust gases from vacuum pump 115 can be directed to the dryer 124 where they are treated to remove moisture from these gases. Some examples of the dehumidification apparatus that can be used are: separation tanks that use baffles to trap moisture in a collection tank, refrigeration cycle dehumidification apparatus that condenses out moisture by way of a cooled evaporator or the exhaust gases could be circulated through a heat exchanger that is cooled by cool air from outside during cool weather to condense the moisture out of the gases. These are just some examples of how the exhaust gases can be dried. Other methods can be applied according to the availability and cost of operation of those methods. The moisture removed from the dryer 124 can be collected as a liquid in receptacle 134 where it can be reused in the drying process or further treated if the collected liquid has some commercial value. In the case of drying the WDG, this collected liquid may be processed to collect, for example, remnant ethanol or corn oil. After the gases leave the dryer 124, they can be sent through valve 128 and line 127 to a recirculation manifold 132 (FIG. 1) and then through supply line 141 back into the treatment zones that surround the extruder 112. Valves 131 regulate the recirculation flow through line 141 as desired. While the recirculation line is shown entering the treatment zone from the bottom it is understood that this recirculation air flow can be arranged to enter the treatment zone from the top, the side or any other position that would optimize the overall efficiency of the drying process.

In the embodiments where the energy reclamation system 123 in FIG. 3 is operational, exhaust gases from vacuum pump 115 pass through valve 129 and flow into the reclamation device 123 to transfer heat to a process stream heat exchanger 126. This process stream can be provided from any process that would benefit from the added heat gained as a result of heat exchange with the vacuum pump exhaust gases. Some examples of how heat reclaimed from the vacuum exhaust gases can be utilized include:

To preheat the material prior to it entering the extruder treatment zones

If the dryer is located onsite of an ethanol plant, then the reclamation heater can be used to supply heat to assist in the production of condensed dissolved solids (CDS)

The reclamation heat can be used for space heating within the operating plant

The reclaimed heat can also be used to heat/preheat hot water for use in the plant A line 155 discharges gases and vapors as they leave the reclamation system. The gases leaving line 155 can be directed back to the treatment zones by a connection through line 127 if they have the sufficient temperature and low humidity to contribute to the material drying process.

While embodiments of the present technology are described herein primarily in connection with an extruder with optional add-on drying features, the concepts are also applicable to other applications, such as drying applications. For example, various embodiments disclose an apparatus and method for drying the treated material using the same apparatus and system 100. As a dryer, this apparatus and method typically comprises system 100 configured having a barrel with no vents. In an alternative embodiment, the system 100 is configured having a barrel wherein the vents are plugged.

Another optional embodiment is to design the system 100 as a dryer unit that vents out the steam to atmosphere, squeezes water out of the grain through the various compression cycles in the screws, and extracts the water through vacuum lines connected to vacuum pumps. The details of such a dryer unit are fully disclosed in related U.S. patent application Ser. No. 13/659,828 which is hereby incorporated by reference.

It should be noted that various embodiments of the device may include one or more controllers 107 that control various sensors and components, such as pressure sensors, humidity sensors, temperature sensors, and drive controls, positioned in various locations throughout the system and connected in one or more computer control loops to set, maintain and control preselected conditions such as temperature, pressure, humidity, density, flow rate, and residence time in the treated material and/or components of the system.

By way of example, in FIG. 1, a series of temperature sensors T1, T2, T3, T4 and T5 can be embedded within or along the wall 106 of the extruder 112 or at other locations within the system. These temperature sensors can be used to sense one or more parameters indicative of one or more conditions of the treated material and/or one or more components of the system so that appropriate adjustments to the heater output, material feeding rate, and screw rotation rate can be regulated to maintain the treated material within a desired temperature range as it moves downward along the treatment zones of the extruder 112. While five temperature sensors are shown in the treatment zones, there could be more temperature sensors or less temperature sensors depending on the material treated the length of the extruder and the desired precision of temperature monitoring within the heating and treatment zone.

It should be noted that the temperature sensors and humidity sensors can be connected in one or more computer control loops where individual heater output regulators, the extruder motor speed regulator, and the distiller grain feed flow controller can all be individually or jointly controlled to maintain one or more preselected conditions of the treated material conveyed along the extruder 112 and/or one or more components of the system. Optionally, the extruder 112 can be provided with an internal heating device 133 that can also supply heat to the material in the treatment zones. The screw heater 133 can be powered electrically or by the same means as provided for the heaters 105 in the zones. The extruder can also be arranged for heating along selective sections of the extruder and/or the screw at selective treatment zones. The control of the screw heating can be included in a computer loop control within the treatment zones, or it could have its own separate control system. In some embodiments, the housing 106 may include predetermined exposed portions that are open or exposed to the environment to vent off the steam collected therein.

During operation of the system, the high moisture content bulk material in the form of loose grain is fed into the extruder by micromanaging the material to extract the moisture content. The material is fed into the extruder and spread in a thin layer, approximately 0.5-5 inches, along the one or more screws. In a multiple compression screws configuration, as the screws rotate, the treated material is compressed in between the screws and conveyed down the screws passing through several treatment zones. In a single compression screw configuration, the ratio of the radius of the profile may be configured to vary inversely to the diameter of the shaft. Thus, as the treated material advances down the screw, it will be subjected to an increasing compressive force due to the increase in the diameter, which will further facilitate compression of the material.

The system 100 shown in FIG. 1 discloses an exemplary single stage unit that can be constructed to any length that is suitable for a particular application. It is however possible to design a system that can include multiple screw units arranged in series or parallel flow or a combination of both serial and parallel flow configurations.

Figure 4A:
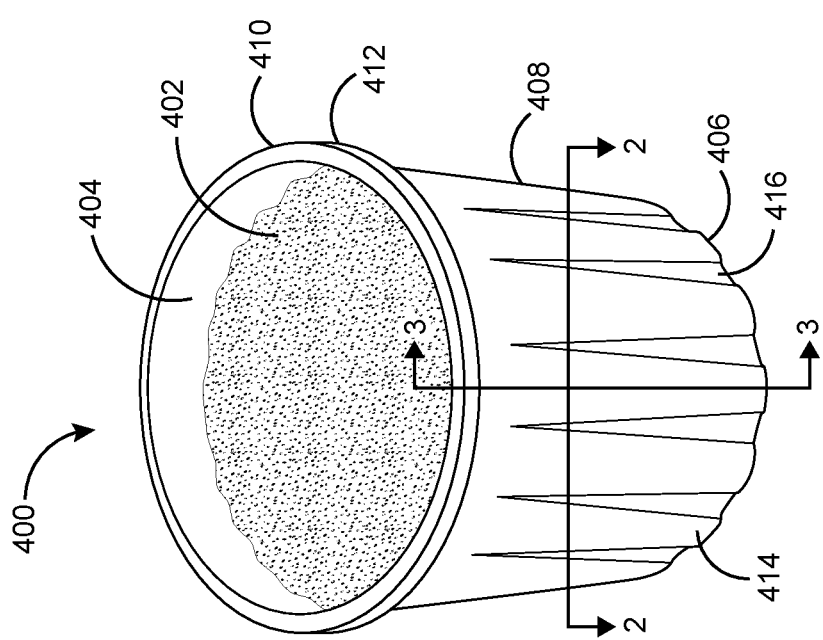
FIG. 4A is a perspective view of a feed tub according to the present teachings.
Figure 4C:
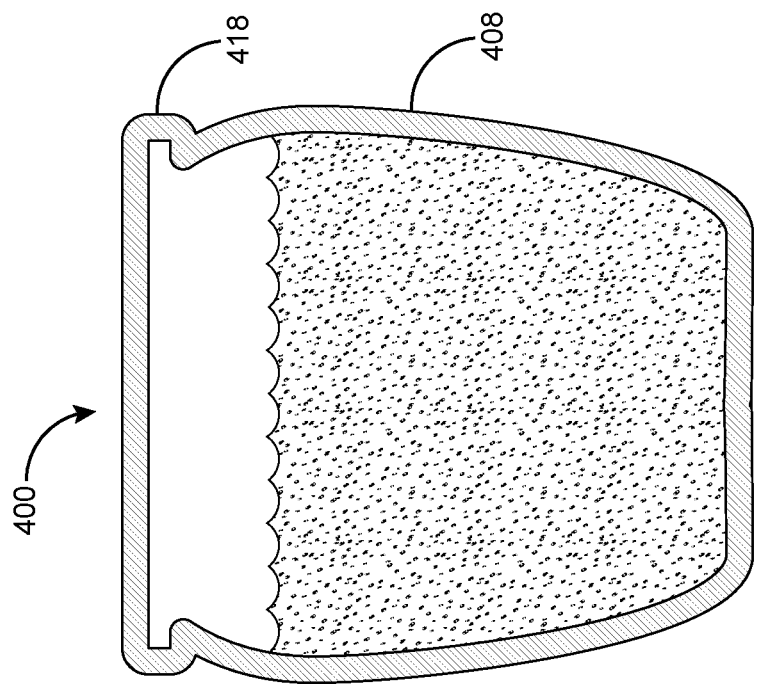
FIG. 4C is a vertical cross-sectional view of the feed tub of FIG. 4A, taken along lines 3-3 of FIG. 4A.
Figure 4B:
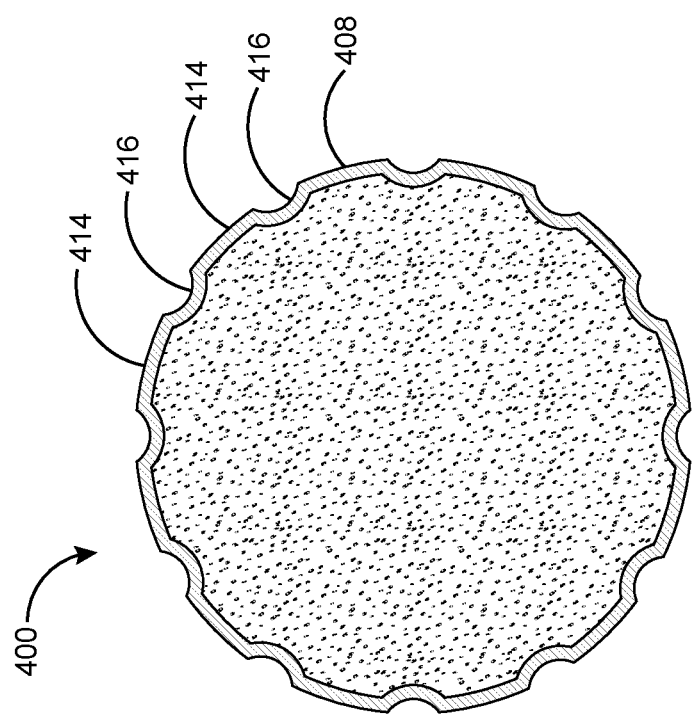
FIG. 4B is a horizontal cross-sectional view of the feed tub of FIG. 4A, taken along lines 2-2 of FIG. 4A.

After the completion of the extrusion process described with regards to and shown in FIG. 1, the treated material is dispersed into an empty container 142 (FIG. 1) or tub 420, for producing a final product of animal feed, such as a solid feed tub 400 (FIGS. 4A-4C). FIG. 4A is a perspective view for such an exemplary feed tub container after the animal feed supplement 402 is solidified therein. FIG. 4B is a horizontal cross-sectional view of the feed tub in FIG. 4A, taken along lines 2-2 of FIG. 4A. FIG. 4C is a vertical cross-sectional view of the feed tub 400 of FIG. 4A, taken along lines 3-3 of FIG. 4A. In this example, the feed tub has an open top end 404, a closed bottom end 406, and a surrounding side wall 408. The open top end 404 is defined by an annular rim 410. The rim 410 of the tub 400 may further include a downturned lip 412 to aid in grasping of the container by a user.

The tub 400, 420 can be made in a variety of configurations having various sizes and shapes. For example, rectangular, square, oval, triangular and the like are suitable configurations for the feed tub 400, 420. Furthermore, the tub can be quite deep or shallow, and its width and length dimensions can be varied to provide for the desired characteristic in such containers.

Figure 4E:
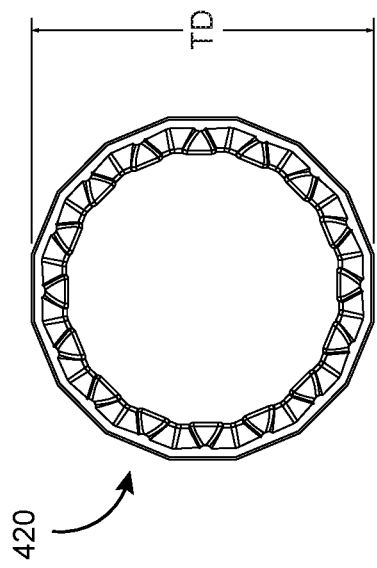
FIG. 4E is a top view of the feed tub of FIG. 4D as produced in accordance with the present teachings.
Figure 4F:
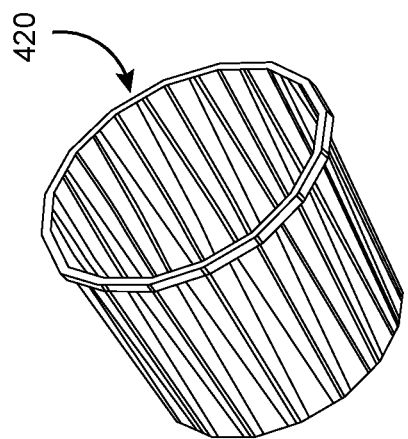
FIG. 4F is a perspective view of the feed tub of FIG. 4D as produced in accordance with the present teachings.
Figure 4D:
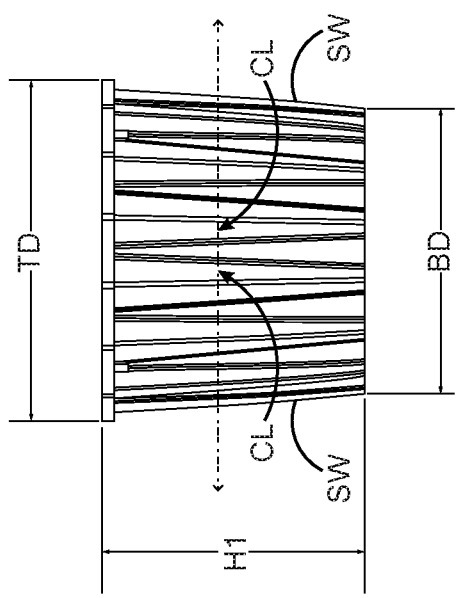
FIG. 4D is a front view of a feed tub produced in accordance with the present teaching.
Figure 5A:
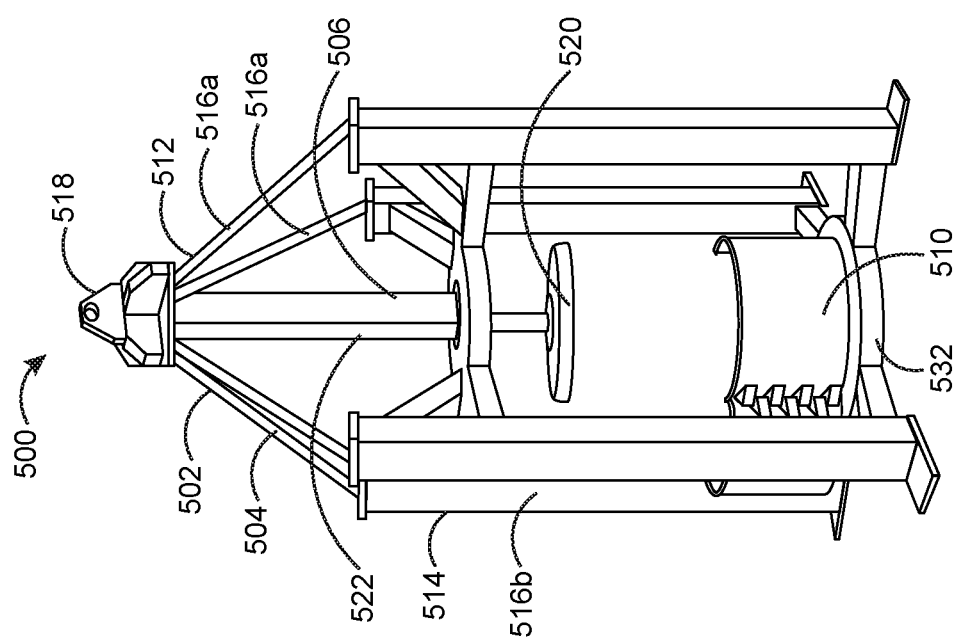
FIG. 5A shows a compression press system without the feed tub enclosed therein according to the present teachings.

FIGS. 4D-4F depict an example of a preferable precompression circular feed tub that is empty with no feed material provided therein before the compression process. The exemplary feed tub 420 is hollow and includes a height H1, a top diameter TD, a bottom diameter BD, side walls SW, and a centerline CL. The preferable pre-compression dimensions of the circular feed tub 420 has a height H1 between approximately 18 inches and 19 inches, a top diameter TD between approximately 20 inches and 25 inches, and a bottom diameter BD between approximately 19 inches and 20 inches. The side walls SW taper at an angle in the range of approximately 1 degree-3 degrees from the top diameter TD to the bottom diameter BD. The circular feed tub 420 is shown having an axis constituting the centerline CL of the tub. The diameter of the centerline CL is approximately in the range of 19.5 inches and 23.5 inches before the tub is compressed by the press system 500 (FIGS. 5A, 5F and 5G). Other suitable dimensions may be used so long as the tub's strength is maintained.

The feed tub 400, 420 may be fabricated from plastic or any other suitable conventional material. For example, the tub 400, 420 may be comprised of a variety of plastics, including, but not limited to PVC, polyethylene, polypropylene, polyurethane and blends thereof. All of these materials can be used, as the above list is not an exclusive one. The feed tub 400, 420 is suitable for manufacture, for example, by injection molding, compression molding, extrusion molding, blow molding, thermoforming, and vacuum forming.

In various embodiments of the feed tub 400, 420, a plurality of expansion panels 414 are provided in the side wall 408 which extend from the bottom end 406 to the rim 410. The expansion panels 414 are distributed at regular intervals within the side wall 408. The expansion panels 414 are formed having, for example, a substantially V-shape. This means that the expansion panels 414 are wide near the rim 410 and taper in a direction of the bottom end 406. Those having skill in the art would recognize various expansion panel configurations that may be used.

The series of circumferentially spaced expansion panels 414 may be separated by vertically extending recessed reinforcing ribs 416 that are spaced from adjacent expansion panels 414. The recessed ribs 416 provide additional strength to uniformly reinforce the side wall so that there are no weak spots in the side wall 408.

In the exemplary embodiment in FIG. 4A, the ribs 416 comprise a region of an inverted "V" shape in the form of a recessed panel defined within the side wall 408. Two adjacent ribs 416 together form the inverted V-shape recessed panel 414. Thus, the cylindrical side wall 408 is divided into a plurality of expansion panels 414 each defined by a tapered rib 416. The ribs 416 in accordance with various exemplary embodiments of the present teachings may be formed with profiles other than an inverted V-shape, for example, a series of grooves, channels, furrows, flutes, and the like forming ribs, corrugation and the like is exemplary and nonlimiting.

As shown in the top view of the tub 400 in FIG. 4B, the side wall 408 may consist of an alternating pattern as to form on the inside and outside walls a plurality of corresponding expansion panels 414 and recessed ribs 416, respectively. By way of example only, the tub 400 may include between approximately 12 and 16 expansion panels. In other embodiments, the tub 400 may include between 20 and 30 expansion panels. The number of actual panels employed could be greater or less than these exemplary embodiments depending on the requirements of the treated material and the design requirements of a particular tub.

FIG. 5A shows a compression press system 500 without a feed tub enclosed therein. FIGS. 5A, 5B, 5G, and 5F illustrate the compression process to ultimately produce the feed block solidified within the feed tub 400. FIG. 5F shows a compression press system 500 with a plate assembly 520 of a hydraulic ram 506 in an upward position above the feed tub 400 before compression. FIG. 5G shows a cut-out view into a top hat portion 508 with the hydraulic ram 506 in a downward position when the feed tub 400 is situated inside the compression press system 500 during the compression process. The compression process of the feed block may include a computer based controller (not shown) that is electrically coupled to the various components of the system or that operates in a wireless manner. In lieu of or in conjunction with the computer based controller, some or all steps of the compression process of producing the feed block or feed tub may be manually performed.

The compression process of the feed block begins with filling an empty container 142 (FIG. 1), such as tub 420 in a precise manner by the controller with the animal feed composition to thus ultimately produce a final product, such as contained within feed tub 400. At the exit of the extruder (FIG. 1), the animal feed composition is dispersed precisely into an empty container 142, (i.e., tub 420). Although not shown, the system 100 may include a conveyor actuated by a motor so that it moves an empty feed tub 420 beneath the outlet of the terminal end 140 of the extruder (FIG. 1) to receive the next load of material to be compacted. In various embodiments, it is possible to provide a weighing station (not shown) on which each empty feed tub 420 is carried to receive the material. This weighing station may be a suitable scale with the conveyor comprising a flexible belt permitting the feed tub's weight to be felt by the weighing mechanism. If such a weighing mechanism is used, it may be wired into the controlled circuitry of the system and to a controlling circuit for the motor powering the belt so that each feed tub is moved away from the extruder 112 to a compression press system 500 when the feed tub has received a predetermined weight of material.

After empty tub 420 or 142 is filled with the treated material dispensed from the outlet terminal end 140 of the extruder 112, going forward in this description, the filled tub will be further described and discussed with reference to the production of feed tub 400. After filling the tub 400, the tub 400 is transported to a compression press system 500 for compressing the material to form the feed tub. The system 500 provides an apparatus with which the initial volume of the feed material within the tub 400 is reduced significantly by densification under compacting, and the reduced volume is maintained in the feed tub. As shown in FIGS. 5A, 5B, 5F, and 5G, the compression press system 500 includes a support structure 502, a hydraulic ram 506, a top hat portion 508, and an outer metal collar 510 for retaining the tub 400 during compression.

The support structure 502 includes a skeleton frame 504 that enables tub 400 filled with the treated feed material to be quickly and easily installed in and removed from the compression press 500. The skeleton frame 504 includes a top frame 512 and a bottom frame 514, both are connected together by a plurality of posts 516a, 516b, respectively, to constitute the support structure 502 from which the hydraulic ram 506 extends therefrom. The top frame 512 comprises a plurality of tapering top posts 516a that are fastened together at the top of the top frame 512 which forms an apex 518 of the support structure 502.

The hydraulic ram 506 is provided at the apex 518 within the confines of the tapering top posts 516a having a plate assembly 520 (or platen) at the end of the hydraulic ram 506. The hydraulic ram 506 is mounted on the frame of the support structure to compact the feed material within the tub 400. In this example, the hydraulic ram 506 is mounted on the top of the frame and passes through the support structure. When ram 506 is extended, the plate assembly 520 compacts the feed material within the tub 400. Configurations other than those depicted in the exemplary embodiments may be used for the press system, hydraulic ram, and support structure.

The plate assembly 520 may be reciprocated by any suitable mechanism, such as a telescoping hydraulic ram 506. The word "ram" is used in this specification to mean any piston-cylinder or other linear powered actuator. As shown in FIGS. 5A, 5F, and 5G, the hydraulic ram 506 includes a hydraulic cylinder 522 that is connected to the top frame 512 of support structure 502. The plate assembly 520 is connected to the cylinder 522 for generally vertical movement along a path between a retracted position in which the plate assembly 520 is within the upper portion of the frame 512 (FIGS. 5A and 5F) and an extended position in which the plate assembly 520 extends into the top hat portion 508 (FIG. 5G). The hydraulic cylinder 522 may be powered by a suitable electric motor and pump, such devices are commonly known in the art and are not described herein.

When the hydraulic cylinder 522 is activated, the piston moves the plate assembly 520 downward to compact the material within the feed tub for a predetermined time period. As depicted in FIG. 5C, the plate assembly 520 may include a valve vacuum, 523, a valve port 524, and a chamber 546 having an inner plate 528 and an outer plate 530 to form a vacuum chamber within the plate assembly. Greater details of the vacuum chamber created by the plate assembly 520 is described further below.

Figure 5B:
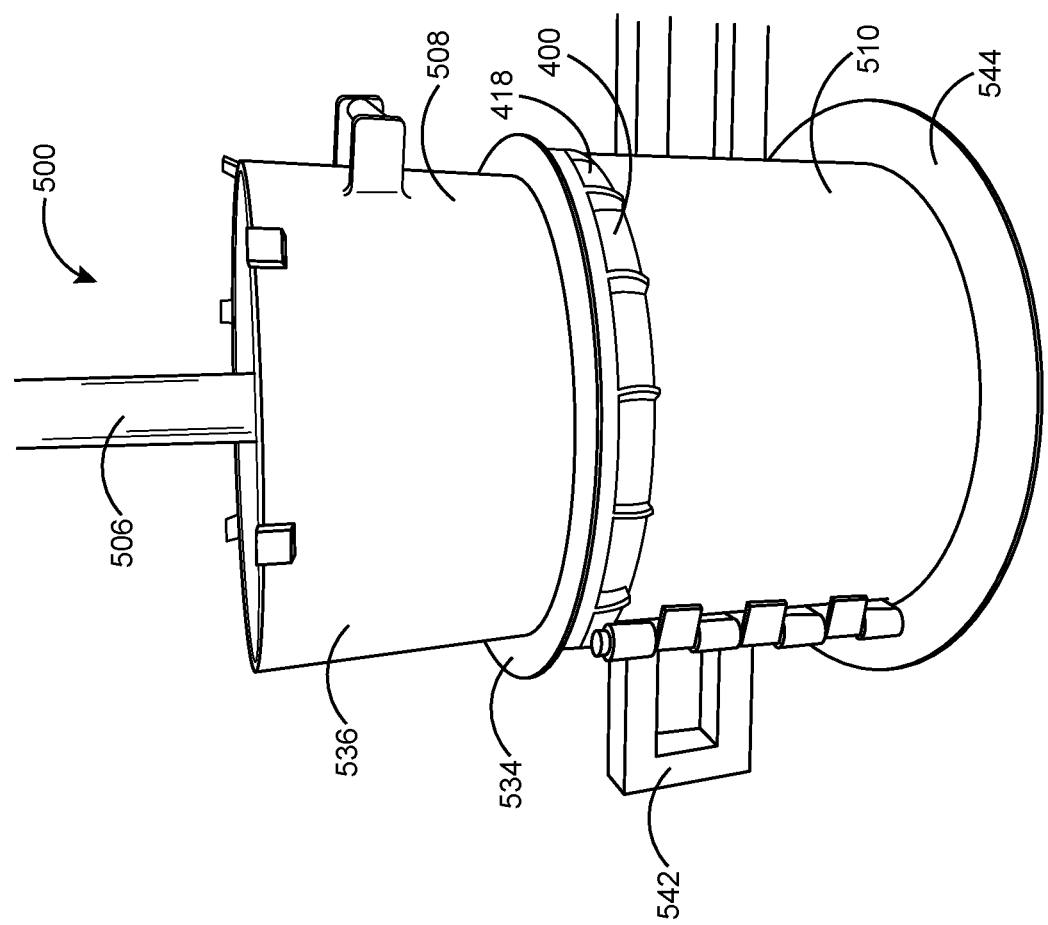
FIG. 5B shows a hydraulic ram, a top hat portion and an outer metal collar of a compression press system for compressing the animal feed supplement into a solid form in the feed tub enclosed therein, according to the present teachings.
Figure 5C:
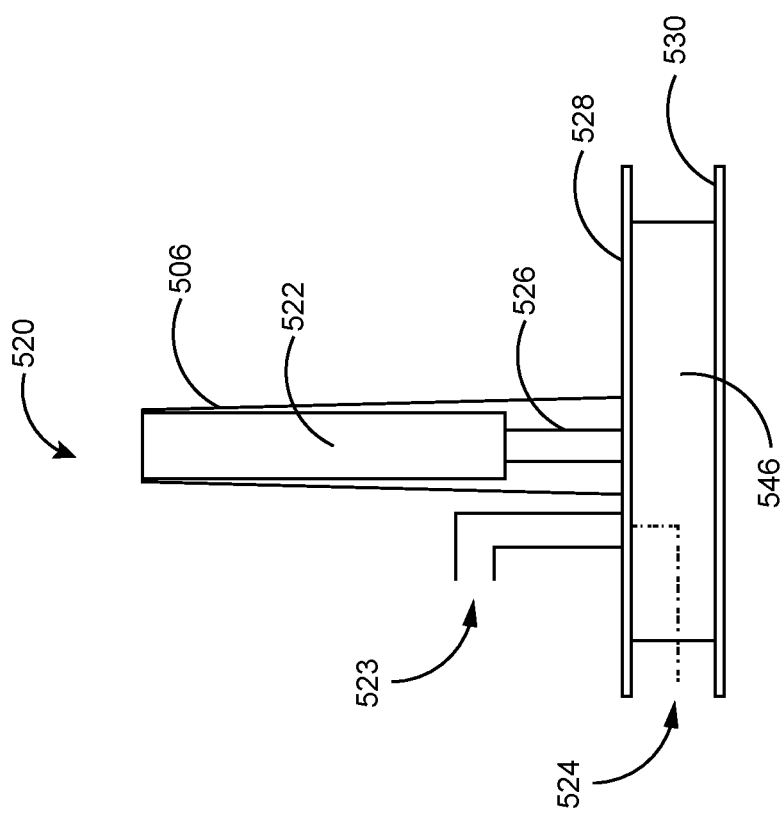
FIG. 5C shows a hydraulic ram piston and plate assembly according to the present teachings.
Figure 5D:
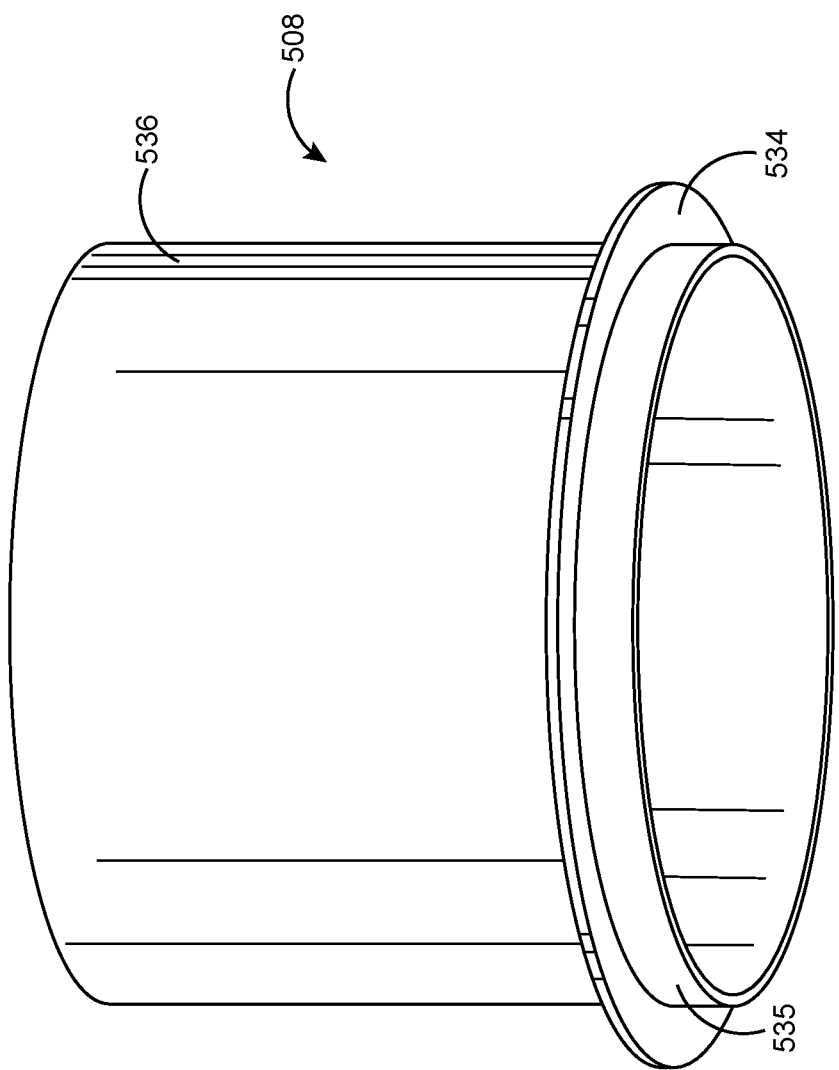
FIG. 5D shows a top hat portion prior to being positioned on an empty feed tub according to the present teachings.
Figure 5E:
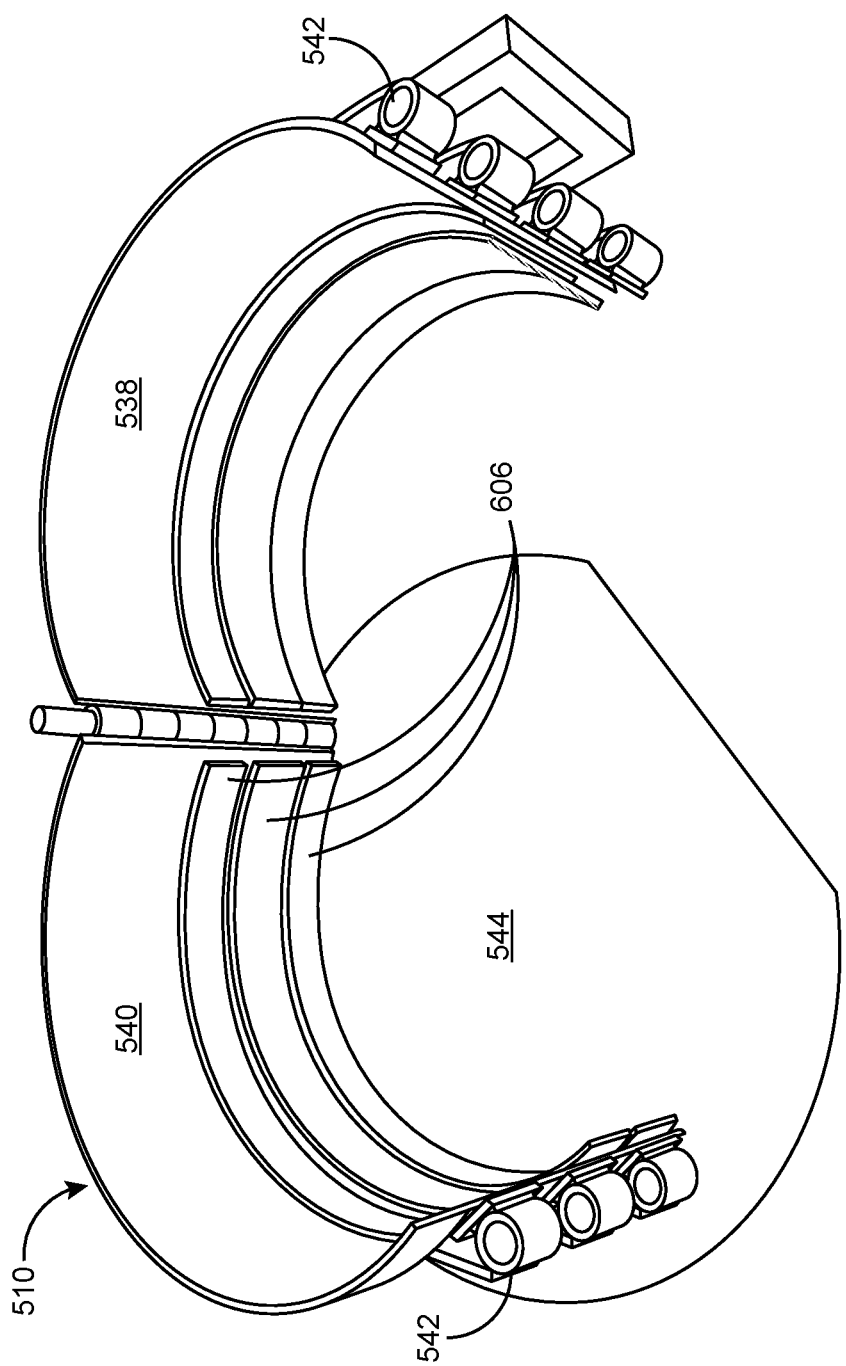
FIG. 5E shows an outer metal collar in an open position for retaining the feed tub within the compression press system during compression according to the present teachings.
Figure 5G:
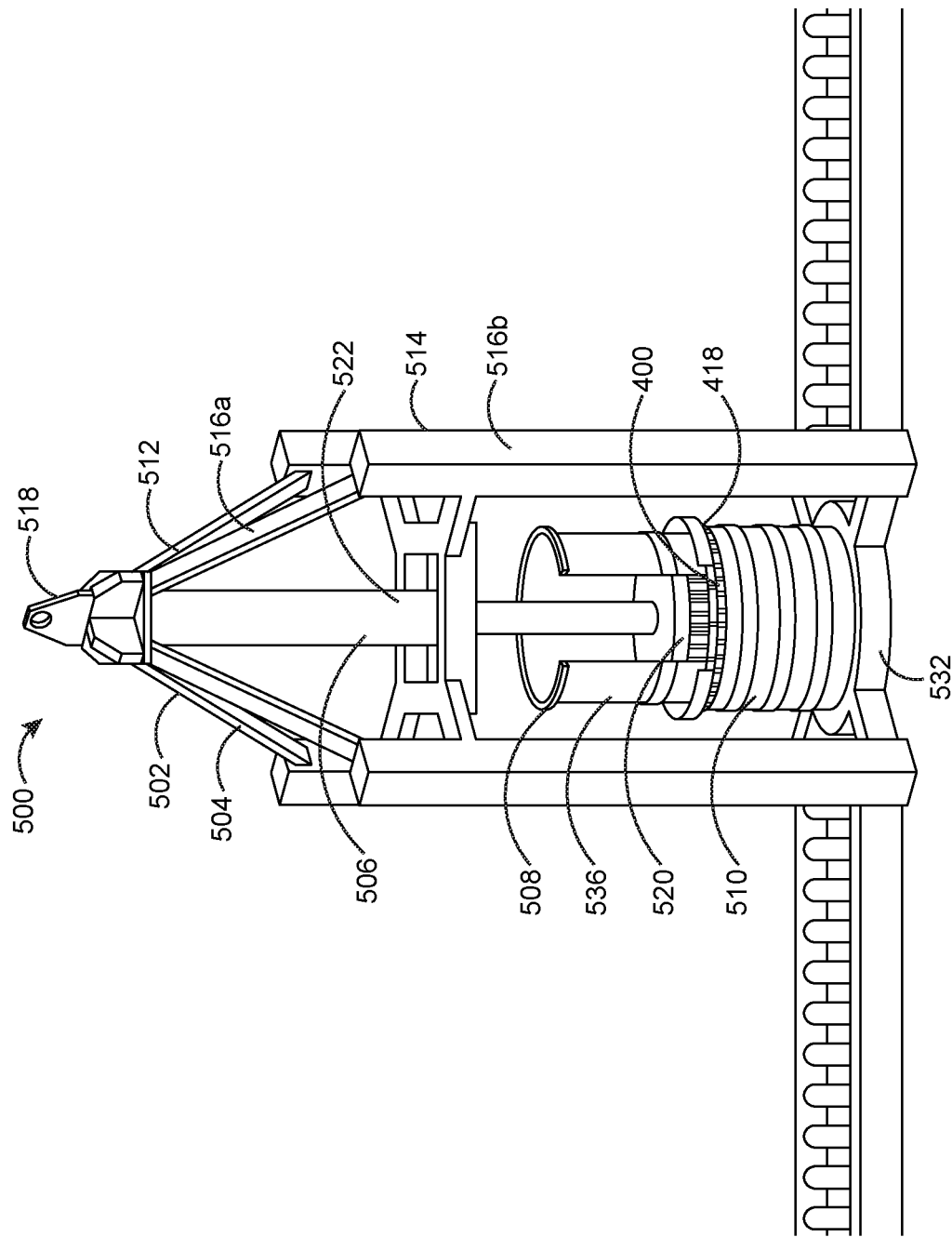
FIG. 5G shows a cut-out view into the top hat portion with the hydraulic ram in a downward position when the feed tub is situated inside the compression press system during the compression process according to the present teachings.

Beneath the plate assembly 520 as shown in FIGS. 5B, 5F, and 5G, the top hat portion 508 and the feed tub 400 enclosed within the metal collar 510 are supported upon the bottom support 532 of the support structure 502. As shown in FIG. 5D, the top hat portion 508 has a generally top hat configuration, and is formed of a metal. The top hat portion 508 has at its base has a planar annular flange 534 and a cylindrical portion 536 that rises from the annular flange. The annular flange 534 extends outward from the base of the cylindrical portion 536 and sits substantially flush upon a top edge surface of the feed tub 400 for providing extra volume to the feed tub. The top hat portion 508 is shaped to include a lip 535. The lip 535 is affixed to and extended from the annular flange 534. The top hat portion 508 is appropriately dimensioned to sit upon the feed tub 400 so that the lip 535 inserts within and engages the top edge surface 418 of the feed tub 400 to form a seal when in use.

In addition to creating a vacuum chamber 546, in which is described with regards to FIG. 5C, the top hat portion 508 is positioned on the top edge surface of the feed tub 400 to also provide extra volume during the process of filling the feed tub 400 with the material being dispensed from the terminal end 140 (FIG. 1) of the extruder 112. To produce the desired final content of the feed tub at a level which is easily lickable by the livestock, the initial amount of feed material dispensed from the extruder into the feed tub 142 (i.e. feed tub 400) in FIG. 1 before compression should exceed the final content of feed material within the tub 400 after compression (FIG. 4A). Thus, an extra volume of the initial feed material that exceeds the volume of the feed tub must be dispensed from the terminal end 140 of the extruder into the feed tub 400. However, the size of the feed tub cannot accommodate the overfilling of the extra volume of feed material. Therefore, prior to being filled, the top hat portion 508 is positioned on top of the feed tub 400 to provide the capacity to accommodate the extra volume of feed material. As the tub is being filled, the extra volume occupies space within the cylindrical portion 536 of the top hat portion 508. The top hat portion 508 is designed having a predetermined volume. For example, the top hat portion 508 may be configured having a volume that is approximately within a range of 95%-105% compared to the volume of the feed tub being compressed. When in the extended position as shown in FIG. 5G, the plate assembly 520 of the hydraulic ram 506 extends vertically within the interior of the cylinder portion 536 of the top hat portion 508 to compress the material within the feed tub 400.

As depicted in FIGS. 5B and 5E, the metal collar 510 is configured having a diameter larger than the feed tub 400 so that it surrounds the feed tub 400. The collar 510, as best shown in FIG. 5E, may be a split cylinder having a pair of hemicylinder walls 538 and 540 pivotally connected along a longitudinal edge thereof. Adjacent to the opposite edge, a lock 542 can be provided. The lock 542 may be a conventional type as shown. A circular bottom wall 544 may be affixed to one of the walls 538 and 540, such as wall 540. During the compression, the collar 510 is closed by the lock 542. It is opened to remove the compacted feed tub 400 after the compression.

In an example of the compression process, initially, an empty tub with the top hat portion 508 positioned thereon is weighed and then filled with the material (DDG) such that the tub is intentionally overfilled with an extra volume of material by a predetermined amount, as described above. For example, to produce a tub having a final weight of 200 lbs., the tub is initially filled with the material having a predetermined weight exceeding 200 lbs. In this exemplary embodiment, the tub may be initially filled weighing 206 lbs., which is six pounds exceeding the final desired weight of 200 lbs. The extra six pounds of material overflows the tub such that it occupies the cylindrical portion 536 of the top hat portion 508. For example, the overfill quantity of the overflow material may be in a range of approximately 3%-10% of the desired final weight of the feed tub.

After being filled, the feed tub 400 is transported from the extruder (FIG. 1) to the compression press system 500 (FIGS. 5A, 5F and 5G). At the press 500, the feed tub 400 is inserted into the metal collar 510. The metal collar 510 is positioned to surround a substantial height of the feed tub 400 without surrounding the top portion 418 of the feed tub 400 as best shown in FIGS. 5B and 5G. After closing the collar 510 around the feed tub 400, the plate assembly 520 is activated hydraulically moving downward (FIG. 5G), compressing and forcing the material downward into the feed tub 400.

The application of the compression force should continue until uniform density of material exists throughout the feed tub 400. To produce a feed tub with uniform density, the material should be uniformly compacted. Optimum uniform densification is achieved by the hydraulic ram 506 and the plate assembly 520 having the capability to apply a sufficient amount of pressure onto the material and to create a vacuum seal during the compression.

The compressive force is applied by the hydraulic ram 504 to compress the animal feed composition residing within the feed tub for a specified press time. Compression of the animal feed with the hydraulic ram shall continue until uniform density of the material exists throughout. In order to produce a feed tub with uniform density, the compressive force is applied for a sufficient time to enable at least one of the oil and liquid within the feed material to spread uniformly throughout the material as it is being compressed. For example, the total press time may be approximately 5-20 minutes. The hydraulic ram 506 may be pressed initially for approximately 1-5 minutes, then released. The hydraulic ram 506 can be pressed again for approximately 5-15 minutes at a hold pressure above 2700 psi wherein the air valve and pump are shut off. These process times are merely exemplary. For other materials, the total press time of the compressive force may be greater or less than the previous example depending on the bulk density, the liquid content, and/or oil content of the material. Instead of minutes, the hydraulic ram can be pressed for approximately a few seconds (i.e., 10-50 seconds) or for a duration of hours (i.e., 1-24 hours) depending on the specific application and/or the treated material being processed.

Movement of the piston, which is connected to the cylinder 523 of the hydraulic ram 506, presses the plate assembly 520 downward onto the material filled within the tub 400, the inner plate 530 is guided into the inlet of the cylindrical portion 536 of the top hat portion 508 and functions as a plunger to compact and push the material downward. The inner plate 530 also creates a seal between the internal walls of the tub 400 and the top hat portion 508. During the compression with the hydraulic ram 506, a certain amount of material from within the tub may leak and spill over the edge of the inner plate 530. Activation of the vacuum valve 523 creates a vacuum that is sufficient to suck away only the amount of material that escapes pass the inner plate 530. Thus, the vacuum is created between the walls of the inner plate 530 and the outer plate 528 which forms the vacuum chamber 546 in the plate assembly 520. Vacuum port 524 evacuates the surplus material from the vacuum chamber of the piston. A vacuum is not produced below the inner plate 530 of the plate assembly 520. Activation of the vacuum valve can be either electronic or manual.

Thus, when the inner plate 532 compresses the material, it is the six pounds of excessive material that is forced out of the tub and accumulates over the inner plate 532, as described in the example above. During movement of the hydraulic ram via the piston 526, the vacuum is produced by the vacuum valve 536, which connects to the vacuum port 538 via a flow path, so that the excessive material is drawn into the vacuum port 538. Then, the excessive material is expelled from the vacuum chamber 546 of plate assembly 520 via the vacuum port 538 and recycled back through the system 100.

When the uniform density is achieved, the pressure in the hydraulic ram 506 via the hydraulic cylinder 522 and piston 526 is reversed, whereby piston 526 and plate assembly 520 is moved back to its initial position as shown in FIGS. 5A and 5F. The collar 510 is opened and the compacted feed tub 400 is removed.

During the compression process, the material within the feed tub must be sufficiently compressed. For example, the pressure applied to the feed material during compression may be set to exceed 80,0000 to 100,000 pounds of pressure distributed over the surface area of the bottom plate of the piston of the hydraulic ram. Thus, tight control over the compression process is important. In addition to monitoring the time period of applying the pressure, it may be necessary to measure the density, in the process, in order to obtain optimum compression of the feed material within the feed tub. Therefore, various embodiments may include a compression determination system for monitoring the compression in the material by the hydraulic ram and the density of the material as the hydraulic ram compresses the material. For example, in some embodiments, the compression determination system may have a controller and a moisture and/or a density sensor (not shown) for measuring the density and/or moisture profile of the feed material during compression. One or more components of the press 500, such as the hydraulic ram and/or plate assembly may be provisioned with one or more sensors that can sense material moisture or density within the material within the feed tub during compression and generate a signal in response thereto. The controller may receive communication from the sensor and control the hydraulic ram responsive to signals from the moisture and/or density sensor. The sensor can be of a capacitive, photoelectric, conductive, ultrasonic, microwave, pressure, or temperature type, as is well known to one of ordinary skill in the art.

In various embodiments, the press 500 may be installed with a stamp device (not shown) which impresses a stamp on the animal feed composition during the compression process. During the compression process of the feed tub, a stamp face can be pressed against the top of the animal feed composition forming the impression of a stamp marking bearing, for example, a company's name on the top of the animal feed composition residing within the feed tub. The stamp can be placed on the bottom of the inner plate 528. In some embodiments, an additional plate can be attached to the inner plate such that the stamp is removable to change the design. In other embodiments, an additional plate having a raised imprint of a logo design may be permanently attached to the inner plate 528.

During the compression shown in FIG. 5G by the hydraulic ram 506, the expansion panels 414 provide the feed tub container with volume varying characteristics (i.e., the internal volume of the container is expandable). The diameter of the collar 510 that surrounds the feed tub 400 when initially inserted into the press 500 is larger than the initial diameter of the feed tub 400. When the compressive force of the hydraulic ram 506 is applied, the feed composition within the tub is pressed with such force to cause the expansion panels 414 to expand such that the expansion panels are laterally "blown" until the ribs 416 in the V-shaped panel are substantially flattened or semi-flattened. By flattening the ribs 416 in the V panel and stretching the V shape, the process expands the panel 414.

This compression force also modifies the shape of the feed tub 400. The compression by the hydraulic ram blows (expand) the feed tub 400 outwardly until the side wall 408 encounters the collar 510 which in turn modifies the original shape of the feed tub, for example as depicted in FIGS. 4D-4F) to have a parabolic shape (FIG. 4C). The tub is made from a plastic material or an equivalent material, which becomes malleable when the material having a temperature with the range of approximately 160° F.-230° F. is introduced into the tub at the outlet terminal end 140 of the extruder (FIG. 1) so that, when pressed during the compression process, the tub will not break or crack. The temperature range of the material enables the tub to become malleable without cracking or breaking.

FIG. 4C illustrates a vertical cross-sectional view representing the parabolic shape of side wall 408 of the feed tub 400 shown in FIG. 4A after compression. The parabolic shape is formed, because the process expands the volume of the feed tub at locations where the collar 510 surrounds the feed tub 400. The top section 418 of the tub does not expand during the compression, because the collar 510 does not surround the top section 418 (FIG. 5B). The shape of the tub 400 along the widest portion of the parabolic shape after the compression expands approximately, preferably within a range of 20%-80%, in comparison to the dimensions of the tub pre-compression, as described above. In some embodiments, even more preferably, the widest portion of the parabolic shape of the tub expands within the range of 40%-65% after the compression. In addition, the feed composition of the DDG (grain) after being pressed upon by the hydraulic ram 506 is at a level slightly below the top of the tub 400 such that it does not cause the top of the tub to expand. For example, the feed composition may be approximately 2 inches to 6 inches below the top of the tub.

As a result of the compression, various embodiments provide a feed tub wherein the animal feed composition is also mechanically compressed into the ribs of the side walls such that, when the feed solidifies, it solidifies rigidly within the grooves of the ribs of the feed tub. As the material is pressed, the compression causes the hottest part of the tub to be located on the inner wall of the tub at the top where the material is leveled off such that the material bonds to the inside of the sidewall forming a seal. When the feed tub 400 is placed out in the field, this seal prevents water from seeping or entering between the compressed feed and the inside wall of the tub itself.

The process of expanding the expansion panels 414 can be controlled. For instance, the volume change of the feed tub 400 can be computed by monitoring the motion of the side wall.

The parabolic shape of the feed tub also functions as an anti-spill mechanism by preventing feed supplement when formed as billet of pressed grain in the tub from spilling out when the livestock overturns the tub over on its side.

Figure 6B:
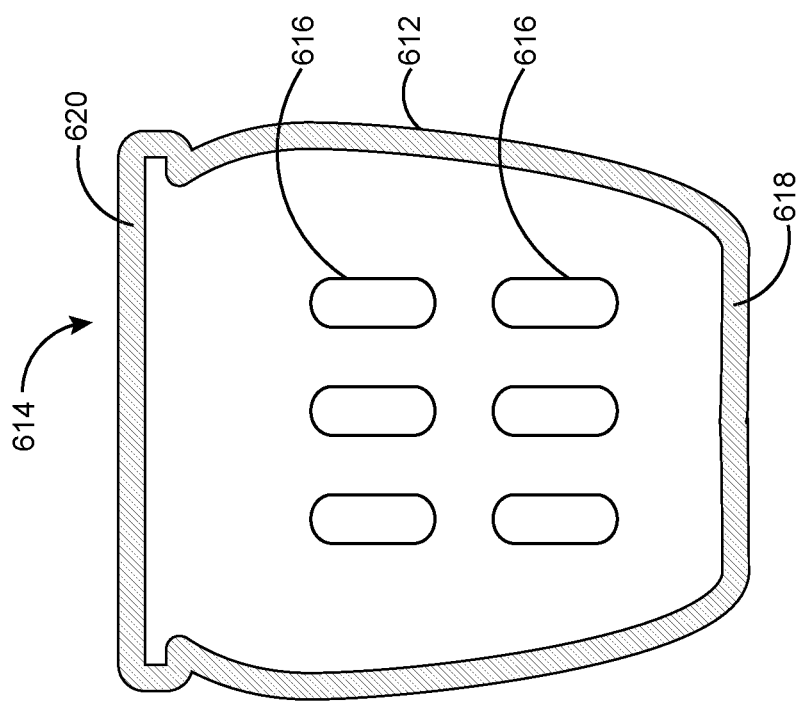
FIG. 6B illustrates another embodiment of a feed tub having perforations formed within the side walls of the feed tub.
Figure 6A:
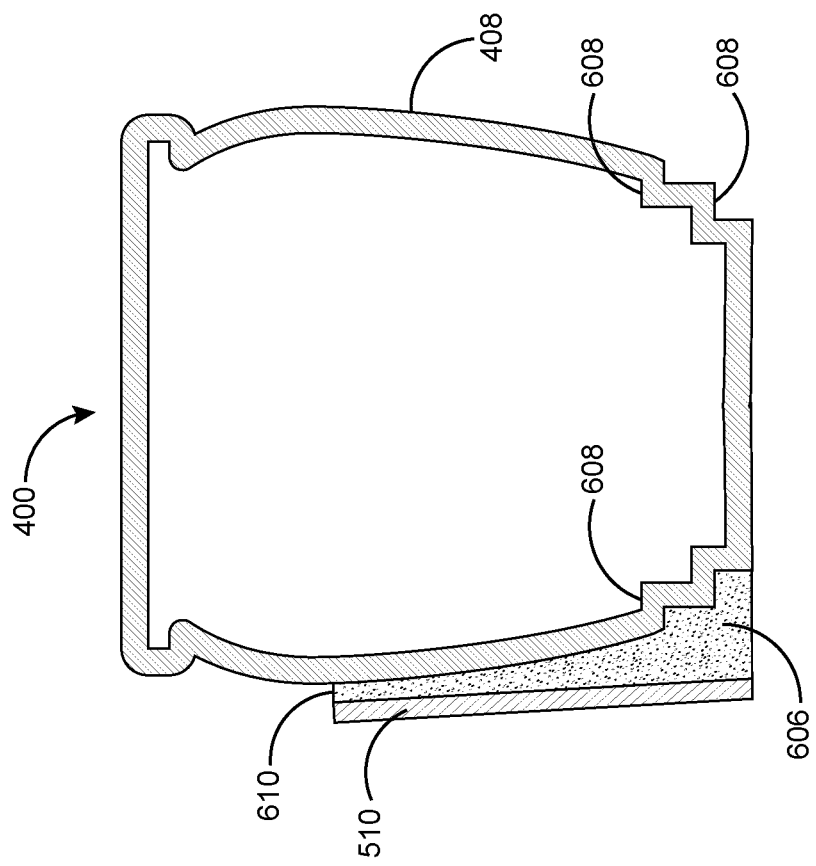
FIG. 6A shows a feed tub enclosed within a metal collar having stacked plates provided within the internal wall of the metal collar.

According to some embodiments as shown in the example in FIG. 6A, another feature of the feed tub, according to the present teaching, is the stackability among the tub containers 400 due to its configuration formed during the compression process. In some embodiments, stacked plates 606 (FIGS. 5E and 6A) may be provided within the internal wall of the metal collar 510 to create horizontal stepped lines 608 defined completely along the circumference of the feed tub when the side wall is expanded outwardly. In various exemplary embodiments, the stacked plates 606 can be formed from steel inserts welded to a clamp 610 within the internal walls of the metal collar 510 to form the steps 508. When the metal collar 510 is positioned to surround the feed tub 400, as described above, these stacked plates 606 provide a stair-stepped indentation 608 in the external side wall 408 of the tub. With the side walls 408 being configured with the steps 608, multiple tubs may be stacked or nested on top of one another.

The V—vertical expansion panels 414 and the horizontal stepped lines 508 are formed in the side wall of the tub so that they intersect with one another, however both feature performs different functions which are independent of each other.

After completion of the compression process, the feed supplement within the feed tub 400 is allowed to cool and hardened in the mold of the feed tub 400. The cooling process may take place under ambient conditions by placing the filled feed tubs 400 in a suitable conventional storage rack so that air can circulate around it for a specified time, for example, approximately 24 hours. Alternately, the filled feed tubs can be placed in a refrigerated space to expedite the cooling process. In other embodiments, the filled feed tubs can be placed on a conveyor belt and passed through a cooling tunnel where cooled air is passed through the tunnel cooling the tubs.

Once fully formed, the edible feed supplement tub has a substantially uniform density throughout the entire product. The edible feed supplement tub has a texture that the livestock can lick, and the high-protein and high-fat content is evenly distributed throughout the tub. The high-protein content delivers essential nutrients for building muscles and providing calories to the livestock. The edible feed supplement tub of the present invention contains no binders or fillers. The edible feed supplement tub has the highest protein and fat content compared to prior art feed tubs. Namely, the apparatus and method produce a solid animal feed supplement that has substantially the same nutritional value as the loose grain before it is initially fed into the system, such that the final product produced by the system does not sacrifice its nutritional value. This results in the highest protein and fat animal feed product in comparison to the current market competitors. The feed tubs according to the present teachings have a uniform density of protein, which enhances the flavor for the livestock, and therefore increases and regulates the animal feed intake. For example, the expected intake may be approximately 1-3 pounds per head daily. Thus, the livestock gets exactly the nutrition they need in an efficient and tasty form. By licking the feed material within the tub, the livestock consumes the same amount each time the livestock licks the feed material. The uniform density of the feed tubs regulates the livestock's consumption intake, without the addition of limiters.

In another embodiment as illustrated in FIG. 6B, a feed tub 614 is configured having an open top end 620, a closed bottom end 618, and a surrounding side wall 612 having animal feed supplement (not shown) solidified therein. The animal feed is formed within the tub 614 using the hydraulic ram as described above. The sidewall 612 extends upward from the bottom wall 618 defining an interior of the tub 614 to maintain the feed supplement in the interior. In this example, sidewall 612 of tub 614 may comprise one or more perforations 616 dimensioned large enough to allow livestock to lick the feed supplement through the perforations 616 when the tub has been placed out for the livestock to feed upon. In this example, the perforations 616 are depicted as a series of ellipses, but it is clear that any shape can be used, such as rectangular, square, oval, triangular and the like. The perforations 616 also help to manage the rate at which the feed within the tub 614 is consumed by the livestock.

In the example in FIG. 6B, the openings of the sidewall perforations 616 and open top end 620 within the tub 614 provide easy access and feeding for the livestock. In the embodiment in FIG. 6B, the openings of the sidewall perforations 616, in addition to the top open end 620, allow access to the solidified animal feed within tub 614 with a minimal amount of effort. Furthermore, the side wall 612 is configured having an outwardly parabolic shape, as described above. The parabolic configuration of the side wall 612 also enable greater access to the animal feed within tub 614. The contour of the parabolic feed tub having protrusive side walls and a top smaller than the side walls also functions to prevent the feed material from falling out of the feed tub. Although the livestock may attempt to pull the feed from within the feed tub, geometrically, the feed material cannot be retrieved by the livestock from within the feed tub. Thus, the animal obtains the feed by licking the feed tub, which is another method of controlling consumption rates.

Figure 6C:
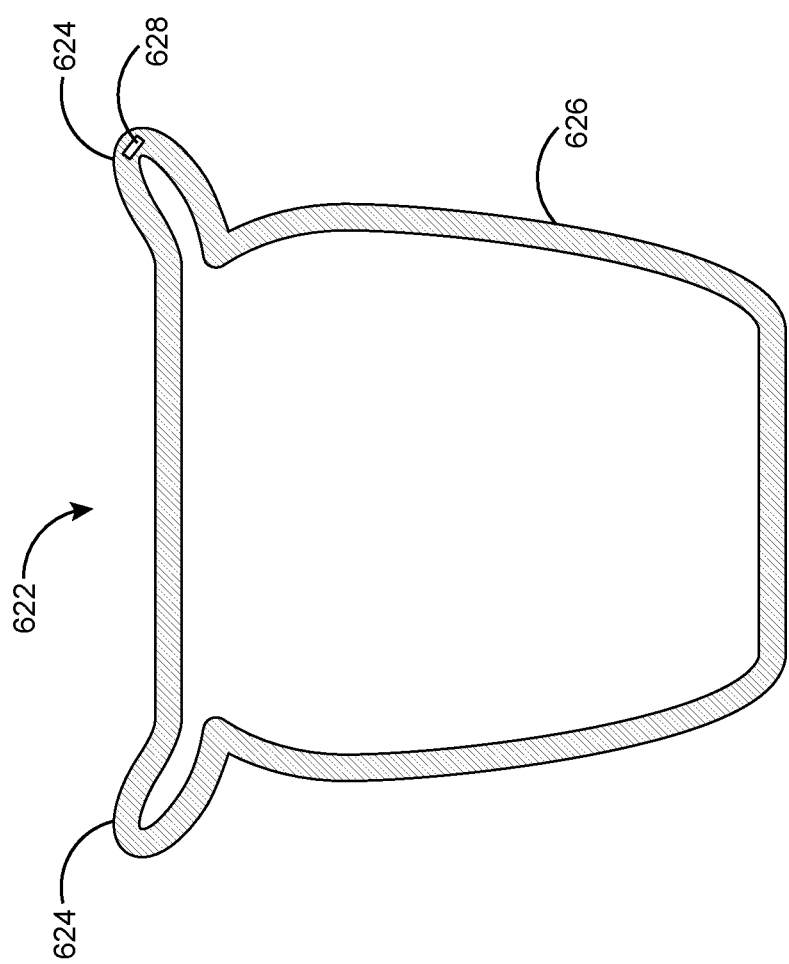
FIG. 6C illustrates yet another embodiment of a feed tub including handles formed within the top of the side walls for gripping the feed tub.

In other embodiments, as depicted in FIG. 6C, the tub 622 comprises at least two handles 624 disposed in the side wall 626 and defining passageways through which a user's hand can pass while carrying the tub 622. Handles 624 are either formed integrally with the top edge of the tub 622 or may be joined to the top edges by ways known in the art. In some embodiments, one or more sensors 628 may be included within one or more handles 624. For example, a sensor 628 electronically connected to a lever (not shown) can be included within the handle to detect a consumption rate of the feed consumed by the livestock. Another example is that one or more handles 624 including sensor 628 can be attachable to a hoist of a crane having a scale that holds the tub 622 to detect the consumption rate. In the preferred embodiment, the consumption rate is approximately one tub for every 20 head of cattle.

Figure 7:
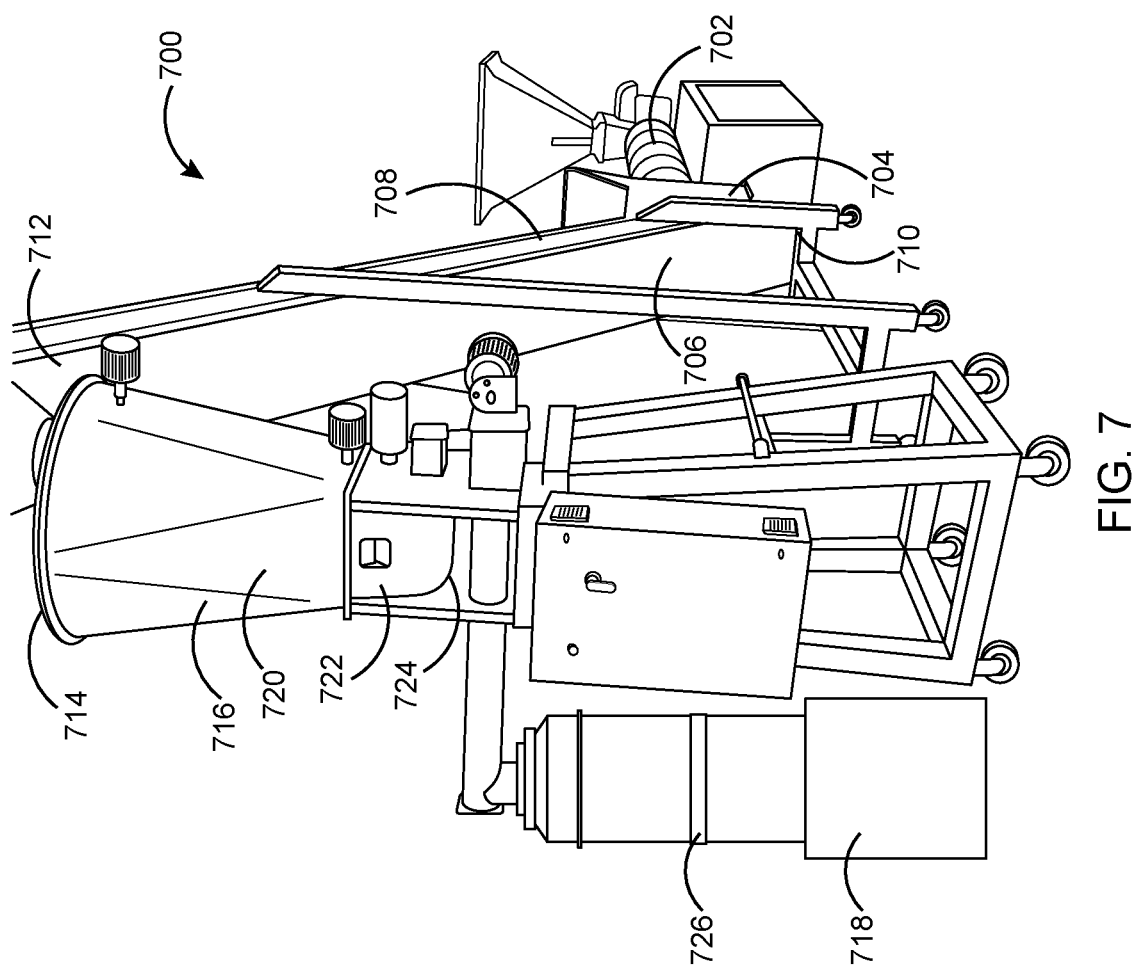
FIG. 7 shows an automated tub press bridge system in according the present teachings.

In an alternative embodiment, an automated tub press bridge system 700, as shown in FIG. 7, can be included as an additional component to the press 500 shown in FIGS. 5A, 5F and 5G. The automated tub press bridge system 700 can be added to press 500 to maintain heat generated within the raw material, such as dried distiller grain with solubles (DDGS), dried distiller grain (DDG), or similar articles, that has undergone a property phase change due to a change of heat, compression of the material, shearing of the material or a combination thereof. After the property phase change, the system 700 enables the raw material to maintain the heat in the product during its transfer from an extruder 702 to a tub 718 and then to the press 500. For example, during the change in state, the heat energy of the grain bulk densifier (i.e., extruder) can be used to change the DDGS from a non-compactable, non-modulus state to a compactable modulus state. The automated tub press system 700 is configured to maintain the compactable modulus state by maintaining the heat in the product while conveying and deliver it to a top hat portion 726 of an empty tub 718 that is ready to receive the raw material.

The automated tub press bridge system 700 can be positioned relative to the extruder 702 such that the entrance of system 700 is located at the exit end of the extruder where the grain exits from the tip of the screws of the extruder and falls into an enclosed hopper 704. The hopper 704 can be enclosed to trap the moisture within the raw material and prevent any moisture from flashing away from the raw material.

System 700 can include an insulated conveyor 706 having an inlet 710 located at the bottom of the hopper 704. The conveyor includes a hood 708 that covers the top of the conveyor and thereby insulates the outside of the conveyor to maintain the raw material at a constant temperature creating a temperature-maintaining chamber.

In various embodiments, the conveyor 706 may include one or more electric heating elements (not shown) controlled by a controller and configured to maintain the material to a predetermined temperature within the conveyor 706. The one or more electric heating elements may be positioned at one or more locations along the surface of the conveyor 706. For example, the heating element(s) may be positioned along the outside surface of the conveyor. However, the conveyor could be heated using another mechanism, such as through conventional high-velocity heat or circulating hot oil along an outside portion of the conveyor. In other embodiments, the conveyor may not include any electric heating elements.

The conveyor 706 can be slanted upwardly such that it is elevated at the discharge end 712 of the conveyor. The discharge end 712 of the conveyor cooperates and empties the material into an inlet 714 of a weigh hopper 716. Conveyor 706 can be any suitable insulated conveyor capable of feeding the material to the weigh hopper 716. For example, the conveyor can be configured as any type of conveyor, such as a belt-type conveyor driven by an electric motor having brakes permitting it to stop essentially instantaneously upon demand, thus controlling precisely the feed of materials from the conveyor 706 to the weigh hopper 716.

Weigh hopper 716 can be designed to interact with conveyor 706 to receive and store a designated amount of material. Weigh hopper 716 utilizes highly accurate scale(s) or load cell(s) (not shown) to ensure an exact and controlled amount of product is introduced to an empty tub 718. The scale(s) or load cell(s) detect the instantaneous weigh of hopper 716. The weigh hopper 716 can be configured, for example, having an inlet, a frusto-conical portion 720 terminating in a discharge opening 722 normally closed by a gate 724.

Similar to the insulated conveyor 706, the weigh hopper 716 can also be insulated and include one or more electric heating elements (not shown) positioned on the outer surface. The weigh hopper 716 can also be controlled by a temperature controller to maintain the material temperature. If the material temperature significantly decreases throughout the process, then the material will detrimentally change from a compactable, modulus state back to a non-compactable, non-modulus state. If the material reverts to its original state while being transferred from the extruder or being loaded into the empty tub 718, when the loaded tub reaches a press station 500, the press may be unable to compact the material to a desired compressible level within the tub.

Operation of the various components of the automated tub press system 700 can be monitored and controlled by an electronic control unit (ECU) or a controller. During use of system 700, a designated amount of material is feed into the weigh hopper 716 via operation of the conveyor 706, which terminates the feed of the material when the scale(s) or load cell(s) detect that the designated amount of material has been fed into the hopper 716. Specifically, when the scale(s) or load cell(s) detect that the designated amount of material has been fed into hopper 716, they transmit an electrical signal to the ECU, which in turn transmits a signal to conveyor 706 which deactivates the conveyor motor (not shown) and applies the motor's brake (not shown). The ECU transmits a signal to open gate 712 of the weigh hopper 716 and empties the material into a top hat portion 726 resting on top of an empty tub 718. The amount of material by weight that is emptied into the top hat portion 726 and empty tub 718 is approximately 95% of the total volume of the top hat portion and the tub combined. For example, this measurement leaves a range of approximately one-two inches of the top hat portion 726 remaining uncovered by the raw material. The weigh hopper gate 724 is then closed by the ECU so that weigh hopper 716 can be refilled for the next batch of material.

While system 700 preferably includes the described hopper 704, conveyor 706, and weigh hopper 716, the principles of the present invention are equally applicable where an alternatively constructed hopper, conveyor, or weigh hopper can be used to maintain the state of the phase changed material by monitoring, regulating, and/or controlling the heat within the product.

Figure 8B:
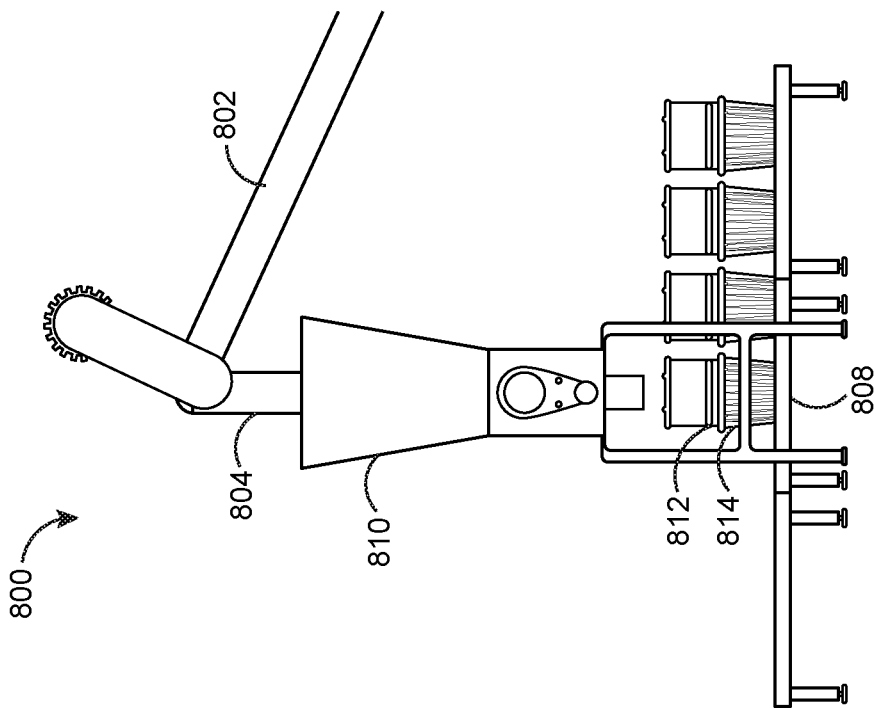
FIGS. 8A-8B show an alternative exemplary embodiment of the automated tub press bridge system according to the present teachings.
Figure 8A:
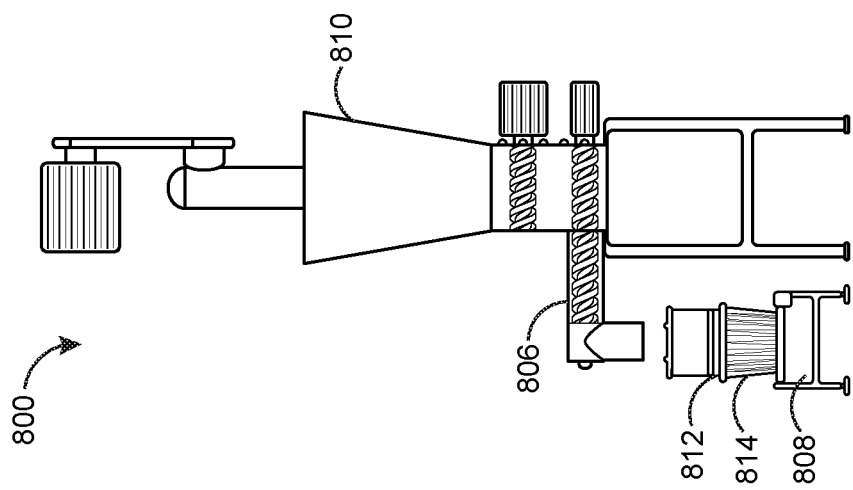
Figure 10A:
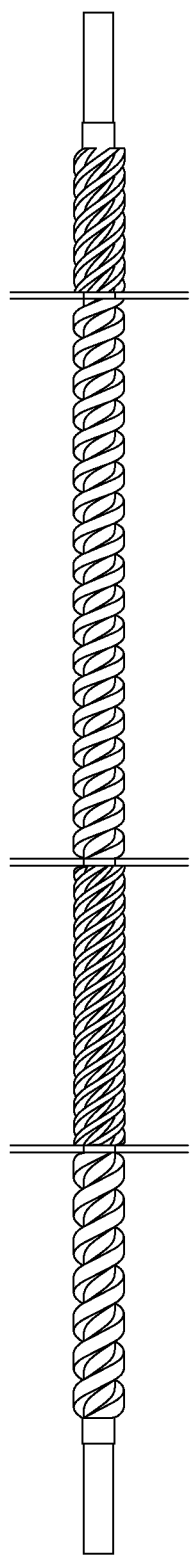
FIGS. 10A-10F depict various exemplary embodiments of compression screws that can be employed in the apparatus of FIG. 1.
Figure 10B:
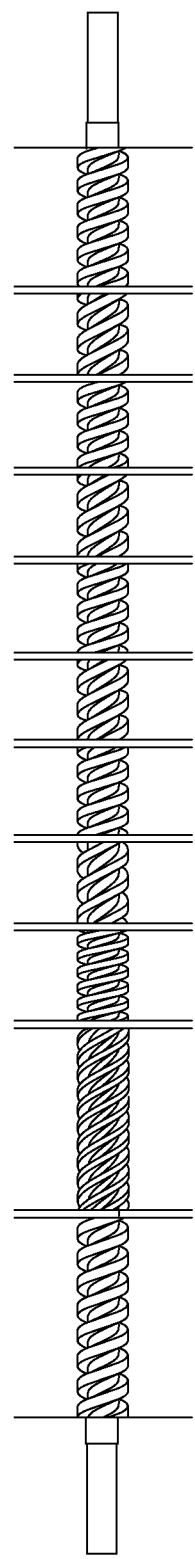
Figure 10C:
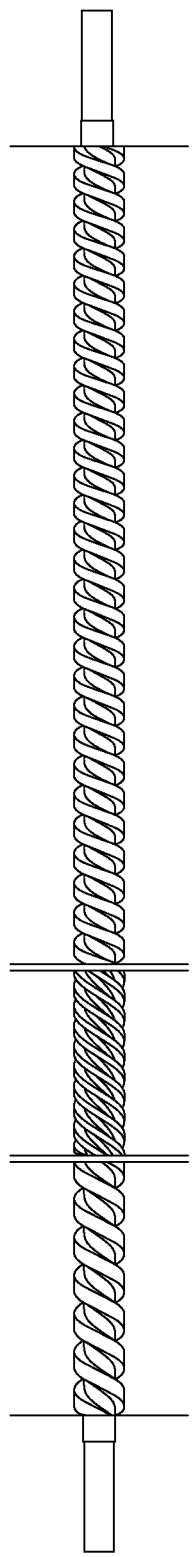
Figure 10D:
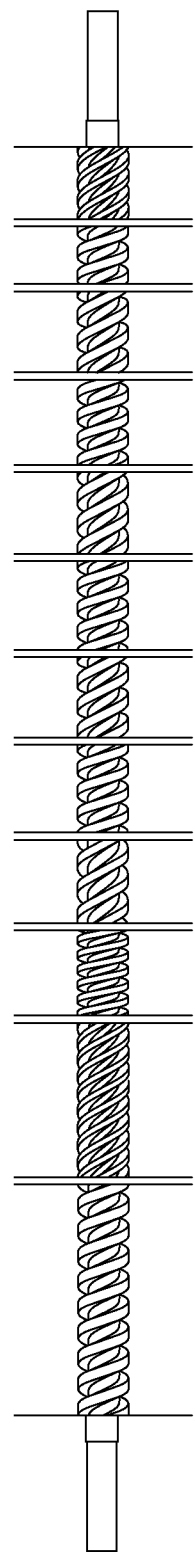
Figure 10E:
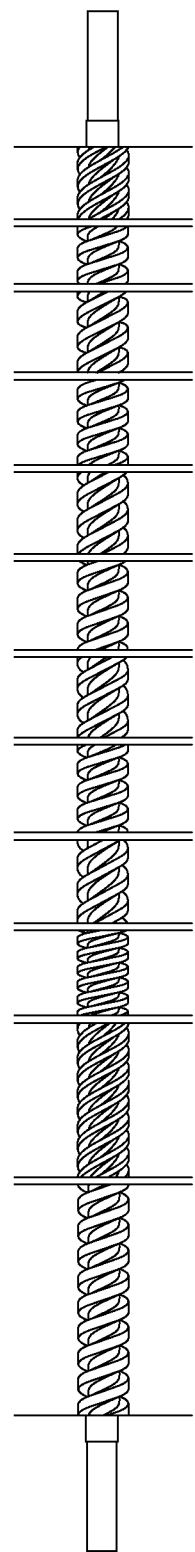
Figure 10F:
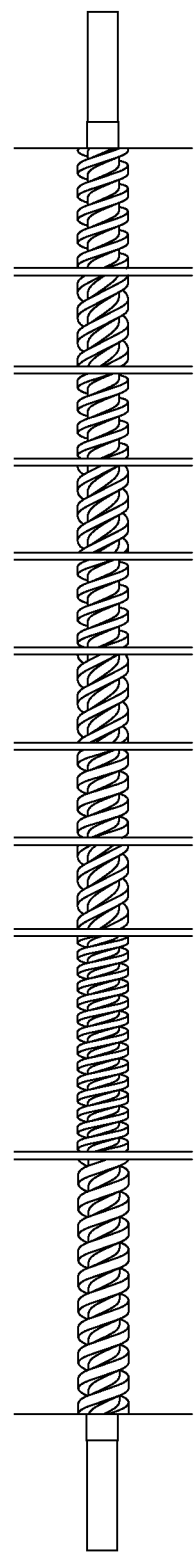

In lieu of the weigh hopper 716 in FIG. 7, in some exemplary embodiments as depicted in FIGS. 8A-8B of an alternative embodiment of the automated tub press system 800, a hopper 810 receives the material from an exit end 804 of a conveyor 802. A dosing screw(s) 806 can be positioned at the bottom of the hopper 810 and functions as an auger that rotates and delivers the raw material to the entrance of the top hat portion 812 and the tub 814. The empty tub 814 and top hat portion 812 can be positioned on a scale 808 that weighs the amount of material that is being delivered by the auger 806. The hopper 810 meters an amount of material necessary to fill the tub 814. The auger 806 moves the material from the hopper 810 into the tub 814. A controller (not shown) is electrically connected to the hopper 810 such that the hopper 810 may signal the controller (not shown) to stop the auger 806 once the hopper 810 is filled to a predetermined level. When the hopper 810 is again ready to receive further material, it will signal the controller to start the auger to again begin transferring the material.

In this embodiment, hopper 810 and auger 806 can be configured having insulation and electric heaters along on the outer surface. The hopper 810 and auger 806 can be controlled by a temperature controller to maintain the material temperature.

FIG. 9 is a flow diagram describing the extrusion-compression press process 900 that may be utilized to form either a solid feed block or a solid feed tub according to one or more of the embodiments of the present teachings. At step 902, the extrusion process starts. At step 904, distiller grain (DDG), with no additives, is feed into the extruder and mechanically compressed to produce a property phase change of the material within the extruder to form the animal feed composition. At step 906, the animal feed composition is delivered to a mold of a block or a feed tub. In step 908, the mold or feed tub is transported to a compression press. In step 910, the press is closed so that a hydraulic ram applies, for a specified press time, a compressive force to compress the animal feed composition in the mold or feed tub having a substantially uniform density throughout the product. In a feed tub embodiment, in step 912, the animal feed composition is mechanically compressed into the ribs of the side walls such that the feed will solidify rigidly within the grooves of the ribs to form the feed tub. In step 914, the compressive force applied causes the expansion panels of the feed tub to expand. In step 916, the mold or feed tub is removed from the press and allowed to cure to permit the compressed feed supplement to achieve the desired hardness to form the solid feed block or solid feed tub.

In use as a feed tub, the edible feed supplement is contained in the tub 400 and accessed by the livestock through an open top end 404 which exposes the edible feed supplement. While the opening 404 is shown as being generally circular, it may have any desired shape including without limitation polygonal and/or irregular peripheries. In various embodiments, the edible feed supplement has a texture that the livestock licks, thereby increasing consumption time. While embodiments of the present technology are described herein primarily in connection with a solid animal feed, the concepts are also applicable to other animal feed products having a high-fat and high-protein content, with no additivities, such as dry grain, cubes, range cubes, calf cubes, mini-cubes, pellets, or any other suitable animal feed product.

During operation, extrusion conditions are created within the extruder so that the product emerging from the extruder has substantially the same nutritional value as the loose DDG before it is initially fed into the system 100, such that the final product produced by the system does not sacrifice its nutritional value Thus, in various embodiments, an apparatus and method is configured to produce an animal feed supplement with essentially the same nutritional value that the loose grain possesses with a slight increase in the final fat (oil) content that is detected on a dry basis analysis of the feed, which was described in reference to Tables 1 and 2. The animal feed is produced from mechanical manipulation of the distiller grain and no binders or fillers are used. This results in the highest protein and fat animal feed product in comparison to the current market competitors.

The final fat (oil) content of the treated grain after the extrusion process remains substantially the same or increases on a nutritional analysis basis as that of the initial fat (oil) content of the distiller grain before extrusion. This results in the highest protein-and-fat content animal feed product in comparison to the current market competitors, because the final product is produced without any sacrifice in terms of nutritional value, for example, to the fat (oil) content and the protein content. The resultant product contains approximately 50% more of fat and approximately 30% more of the protein in comparison to current competitors. The resultant product produced as a result of the present teachings contains approximately in the range of 25%-35% of protein, preferably 30%, and in the range of 8%-16% of fat (oil), preferably 12%, on a dry basis analysis. In comparison, the final feed product of typical competitors contains 20% protein and 6% fat (oil) content on a dry basis analysis.

During passage of the animal feed through the extruder, the manual manipulation of the screw assembly acts on the treated material to create the desired pressure. That is, as the treated material is advanced along the length of the single screw or multiple-screws, it continually encounters the areas of the screw which generate relatively high localized pressure serving to push the material forwardly, at the same time, the material is kneaded in the various screw zones as the screw(s) rotate. The result is an intense mixing/shearing and heating action within the extruder.

Thus, the present teaching provides a system and method for incorporating higher levels of fat into the animal feed product, with manual manipulation of the extruder, so as to provide a higher level energy source to the animals consuming the feed supplement. The animal feed product has been prepared according to the present teachings having a fat (oil) content from approximately 8% to 16%. As discussed above and described in reference to Tables 1 and 2, the protein and fat (oil) content in the final product in solid form, such as cube, pellet, block, and tub, is the same as the protein and fat (oil) content of the raw material in loose grain (DDG) form. As shown in Tables 1 and 2, only the fat (oil) changes on an analysis basis, which is increased approximately by ½% to 2.0%. The process squeezes or releases the oil from the loose grain (DDG) as it undergoes a physical property change to produce the final feed product. The laboratory analysis is capable of measuring the released fat (oil) in the final product in solid form and not fat (oil) in loose grain (DDG) form. Thus, no additional oil is added to the material to produce the final feed product prepared according to the present teachings. The small increase in fat (oil) in the final product is essentially the same fat (oil) content in the loose grain (DDG), but it only increases by way of analysis. In contrast, all other competitors need to add binders and fillers, which dilutes the protein by 30% and fat (oil) content by 50%.

It will be apparent to those skilled in the art that various modifications and variations can be made to the system and method of the present disclosure without departing from the scope its teachings. By way of example, the product can be processed by a die located upstream of the dispensing end to form a final product, for example, of range cubes, pellets or both having a diameter ranging from approximately ¼% inches to 1 inch. The final product can then be dispensed at a dispensing end and collected in a container.

Other embodiments of the disclosure will be apparent to those skilled in the art from consideration of the specification and practice of the teachings disclosed herein. It is intended that the specification and examples be considered as exemplary only.

What is claimed is:

1. A method for producing a feed product, the method comprising the steps of:
   providing a material to be treated, the treated material having an initial composition of a first nutritional value, the initial composition comprising at least (a) a first protein content and (b) a first fat/oil content;
   advancing the treated material through an extruder comprising a plurality of alternating stages of compression and release;
   dispensing the treated material from the extruder into an expandable container comprising a housing, the housing having a top portion, a bottom portion, side walls defining an initial shape having a centerline in a circumferential direction of the expandable container, and at least one expandable panel disposed within at least one side wall of the housing;
   compressing a volume of the treated material within the expandable container to produce a final product comprising a final composition formed as a solid having a substantially uniform density throughout;
   producing, without adding any nutritional additives or binders to the treated material, the final product having a second nutritional value comprising a second fat/oil content, on a dry basis, within a range of about 112% to 116% of the first fat/oil content; and expanding the at least one expandable panel and the side walls of the expandable container to define a configuration of the expandable container, without expanding the top portion, by compressing the volume of the treated material within the expandable container such that a shape of the housing changes from an initial shape so that a centerline expands approximately within a range of 40%-65% to define the configuration of the expandable container having a substantially parabolic shape; and forming a water seal between the final product and an inside portion of the side walls of the housing by compressing the volume of the treated material such that the treated material bonds to the inside portion of the side walls to form the water seal for preventing water from entering the housing in the configuration of the expandable container.

2. The method according to claim 1, wherein the final product is formed in a shape of a block form, wherein the block form is a solid, rigid form that remains solid once formed.

3. The method according to claim 1, wherein the final product is formed in a shape of a tub.

4. The method according to claim 1, wherein the final product is formed in a shape of a plurality of pellets.

5. The method according to claim 1, wherein the final product is formed in a shape of a cube.

6. A method for producing animal feed, the method comprising the steps of:

providing a material to be treated, the treated material having an initial composition of a first nutritional value, the initial composition comprising at least (a) a first protein content and (b) a first fat/oil content;

advancing the treated material through a plurality of alternating stages of compression and release;

creating heat generated by advancing the treated material through the plurality of alternating stages of compression and release;

applying the heat directly to the material to change mechanical properties of the treated material to convert a physical state of the material from a non-compactable state to a compactable state to produce a compactable material;

dispensing the compactable material into a container;

overflowing the container, during the dispensing of the compactable material, causing the compactable material to overflow into an internal volume of the container and further dispense into an overflow container positioned on top of the container, wherein the overflow container provides an extra volume to the internal volume of the container; and compressing the compactable material into the container to produce a final product comprising a final composition formed as a solid within the container and having a substantially uniform density throughout; and producing, without adding any nutritional additives or binders to the treated material, the final product having a second nutritional value comprising a second fat/oil content, on a dry basis, within a range of about 112% to 116% of the first fat/oil content.

7. The method according to claim 6, wherein the final product is formed in a shape of a block form within the container, wherein the block form is a solid, rigid form that remains solid once formed.

8. The method according to claim 6, wherein the final product is formed in a shape of a tub.

* * * * *